(12) United States Patent
Wilson

(10) Patent No.: US 11,789,494 B2
(45) Date of Patent: Oct. 17, 2023

(54) DOCK FOR PORTABLE ELECTRONIC DEVICES

(71) Applicant: IWS GLOBAL PTY LTD, Malaga (AU)

(72) Inventor: Andrew Munro Wilson, Perth (AU)

(73) Assignee: IWS GLOBAL PTY LTD

( * ) Notice: Subject to any disclaimer, the term of this patent is extended or adjusted under 35 U.S.C. 154(b) by 0 days.

(21) Appl. No.: 17/781,560

(22) PCT Filed: Mar. 2, 2021

(86) PCT No.: PCT/IB2021/051733
§ 371 (c)(1),
(2) Date: Jun. 1, 2022

(87) PCT Pub. No.: WO2021/176353
PCT Pub. Date: Sep. 10, 2021

(65) Prior Publication Data
US 2022/0413551 A1     Dec. 29, 2022

Related U.S. Application Data

(60) Provisional application No. 63/013,644, filed on Apr. 22, 2020, provisional application No. 62/984,862, filed on Mar. 4, 2020.

(51) Int. Cl.
*G06F 1/16* (2006.01)
*G06F 13/40* (2006.01)

(52) U.S. Cl.
CPC ........ *G06F 1/1632* (2013.01); *G06F 13/4068* (2013.01)

(58) Field of Classification Search
None
See application file for complete search history.

(56) References Cited

U.S. PATENT DOCUMENTS

| 9,454,184 B2 | 9/2016 | Lee | |
|---|---|---|---|
| 2002/0008959 A1* | 1/2002 | Helot | G06F 1/1632 361/679.41 |

(Continued)

FOREIGN PATENT DOCUMENTS

| JP | 2010178410 A | 12/2010 |
|---|---|---|
| KR | 2005006733 A | 5/2005 |
| KR | 1020150047095 A | 5/2015 |

OTHER PUBLICATIONS

International Preliminary Examination Report, PCT/IB2021/051733, dated May 6, 2022.

*Primary Examiner* — Hyun Nam
(74) *Attorney, Agent, or Firm* — Craig Fieschko; DeWitt LLP

(57) ABSTRACT

A dock for portable electronic devices (PEDs) such as portable computers, smartphones, and the like has a dock cavity wherein a PED may be inserted. The cavity wall bears an external connector aligned to connect with a PED's onboard connector for charging and/or data communications when the PED is properly inserted in the cavity. However, the external connector retracts within the cavity wall if the PED is misinserted such that it bears against the external connector. The cavity walls are designed to loosely receive (and coarsely align) the PED upon initial insertion, and then closely receive (and finely align) the PED's onboard connector with the dock's external connector as the PED approaches full insertion. The rear cavity wall, against which the leading edge of the PED bears upon full insertion, is configured to resiliently yield upon impact with the PED, thereby decreasing repeated shock damage to the dock and PED.

20 Claims, 16 Drawing Sheets

(56) References Cited

U.S. PATENT DOCUMENTS

| | | | | |
|---|---|---|---|---|
| 2015/0194833 A1* | 7/2015 | Fathollahi | ............... | G06F 1/188 |
| | | | | 320/114 |
| 2017/0153667 A1* | 6/2017 | Suckle | ................. | G06F 1/1632 |
| 2017/0371374 A1* | 12/2017 | Carnevali | ............. | G06F 1/1626 |
| 2022/0400925 A1* | 12/2022 | Hoobler | .................... | B08B 3/02 |
| 2022/0413551 A1* | 12/2022 | Wilson | ................. | G06F 1/1632 |

* cited by examiner

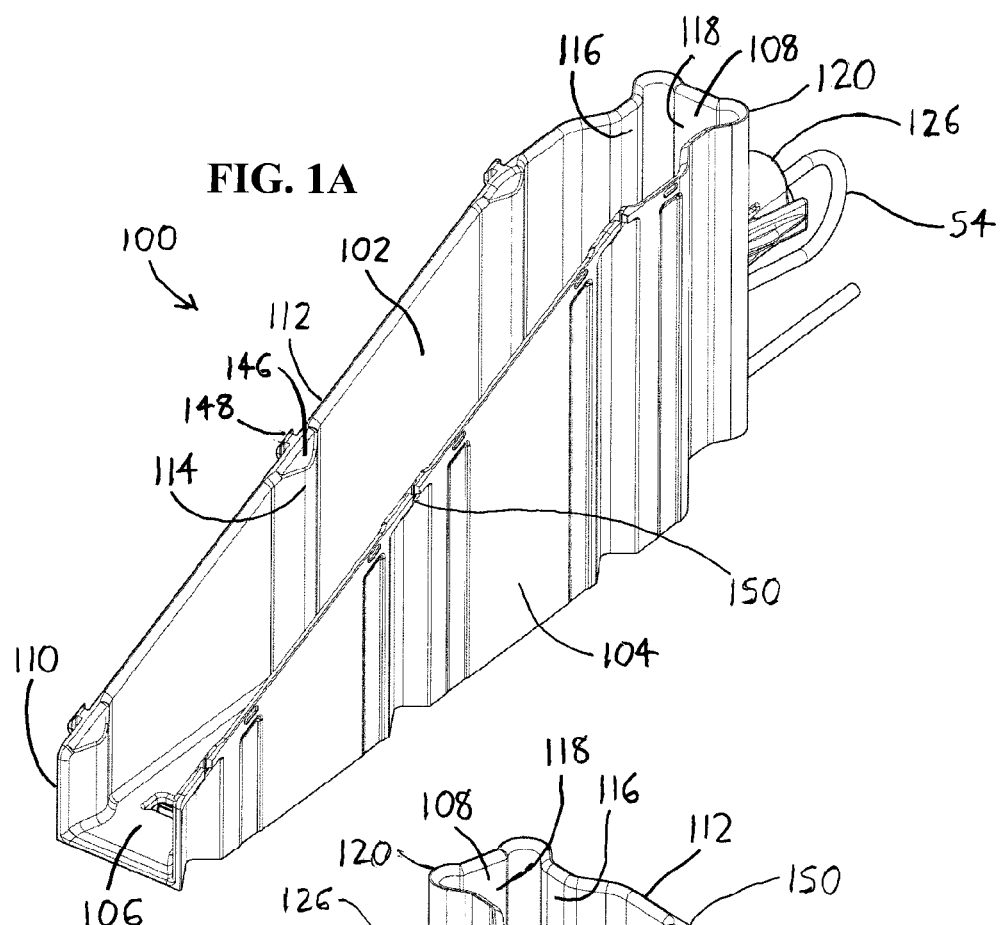
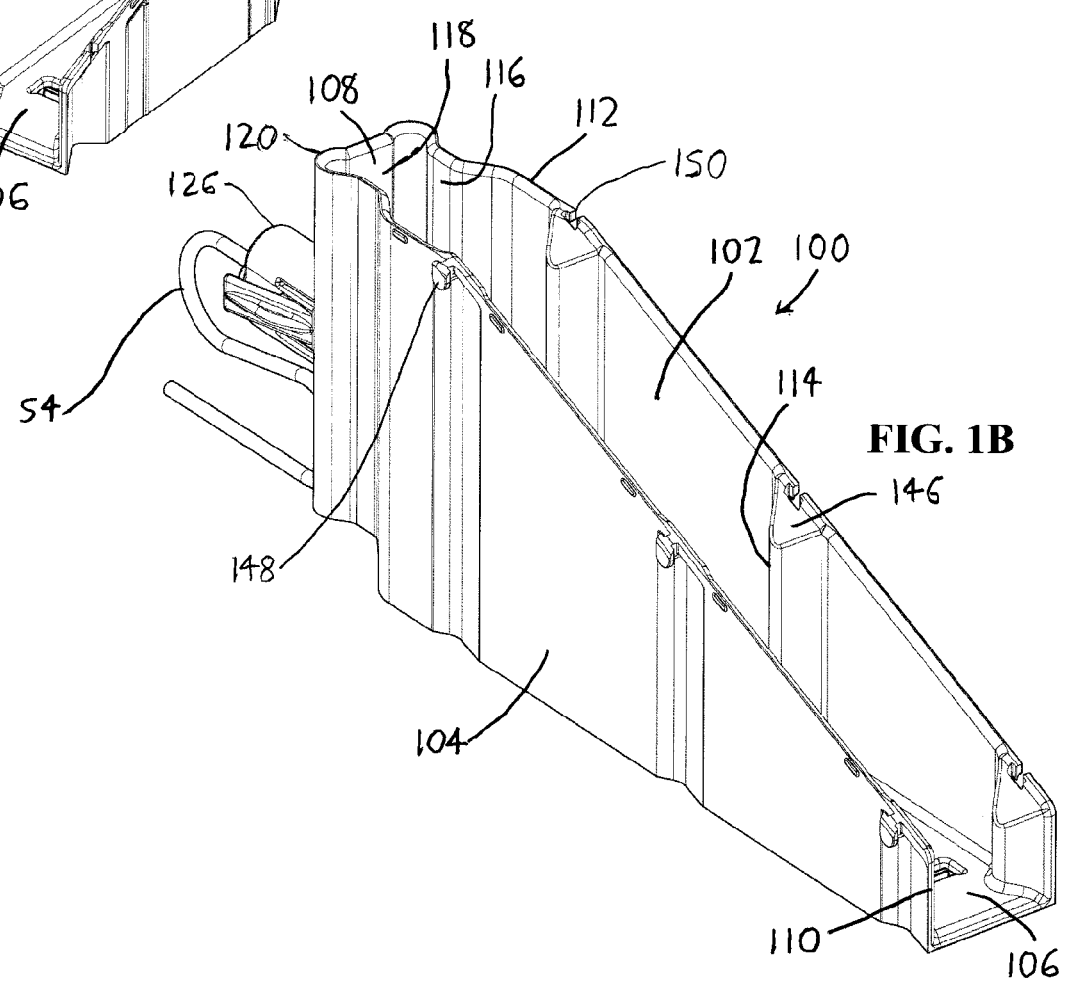

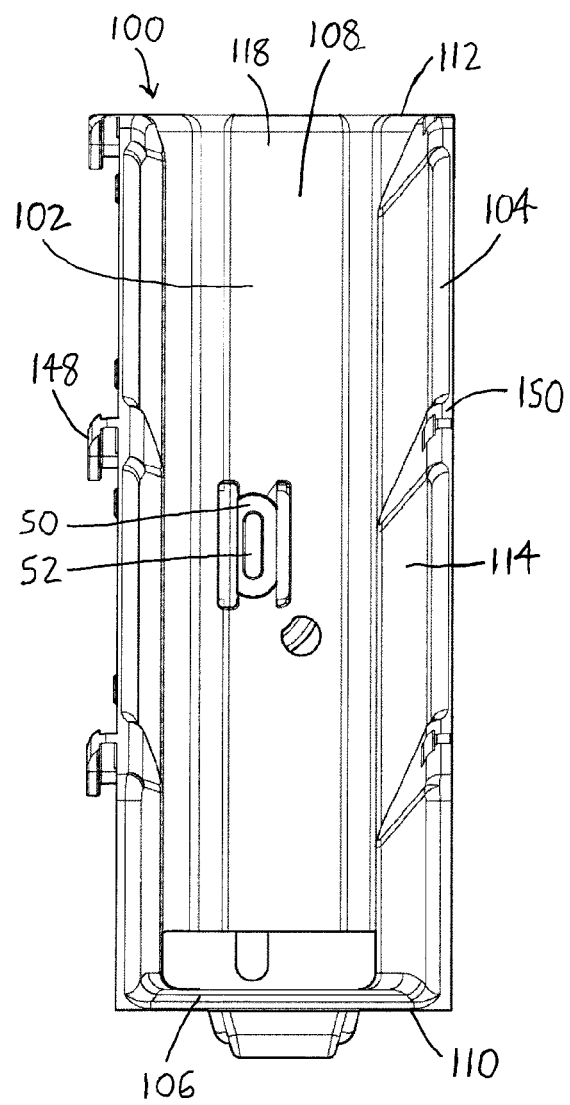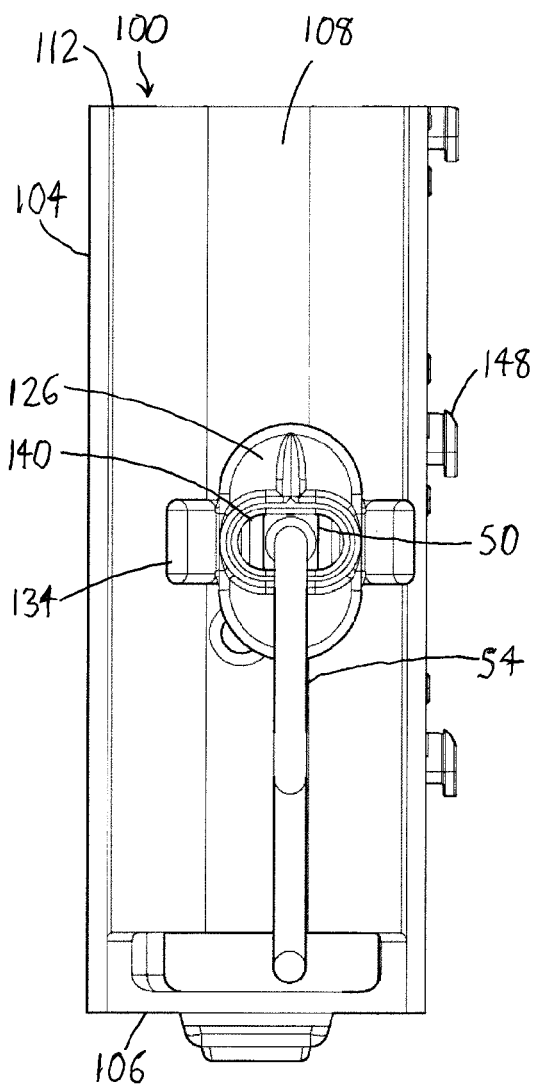

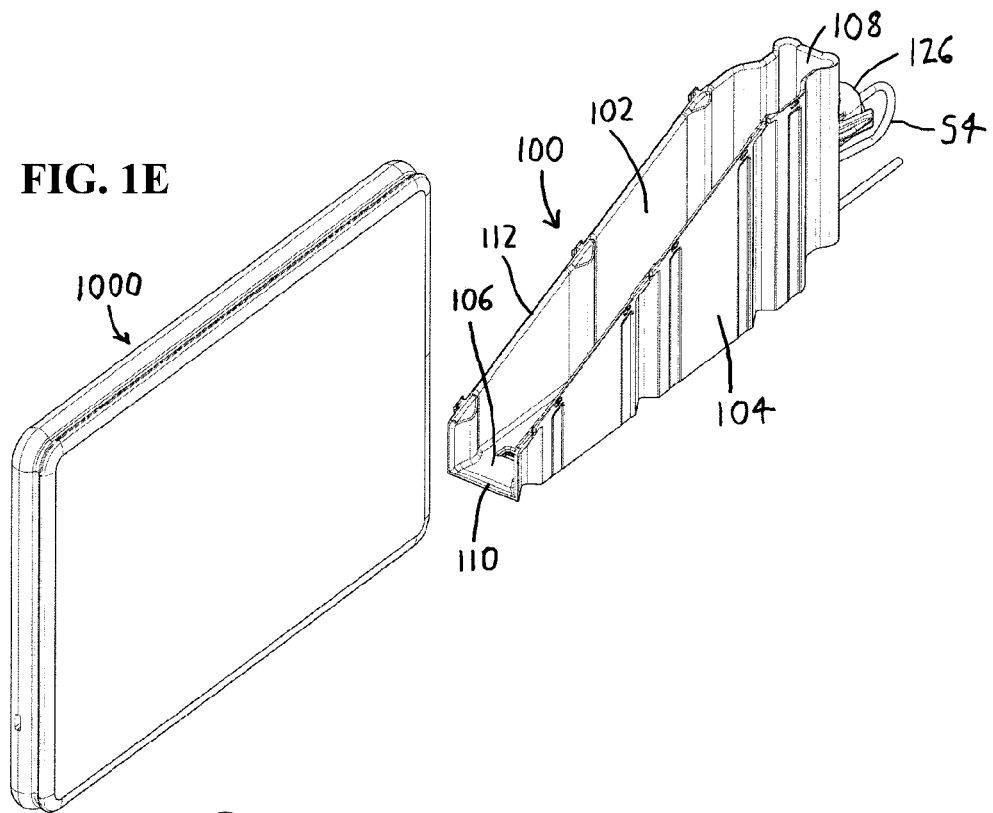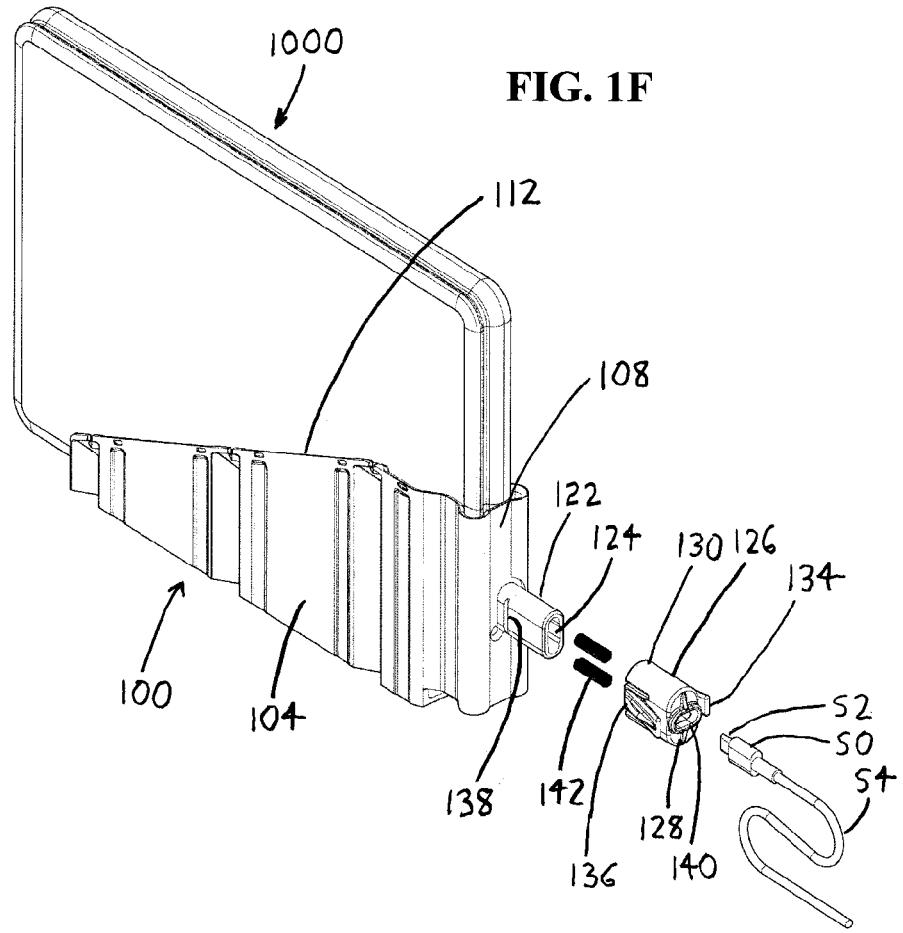

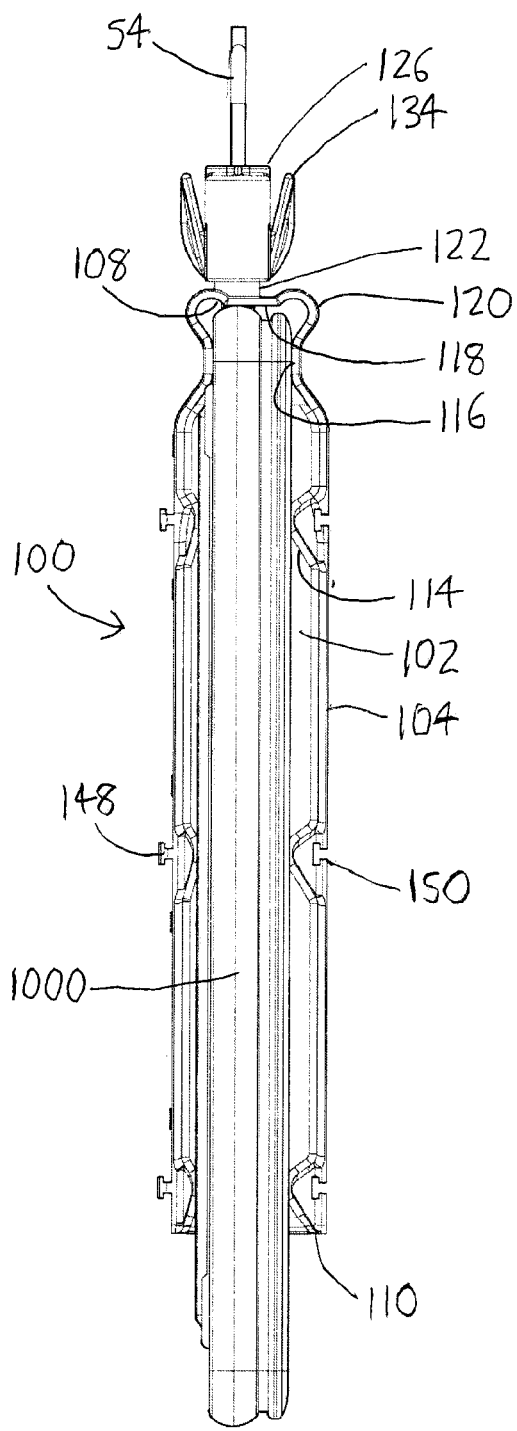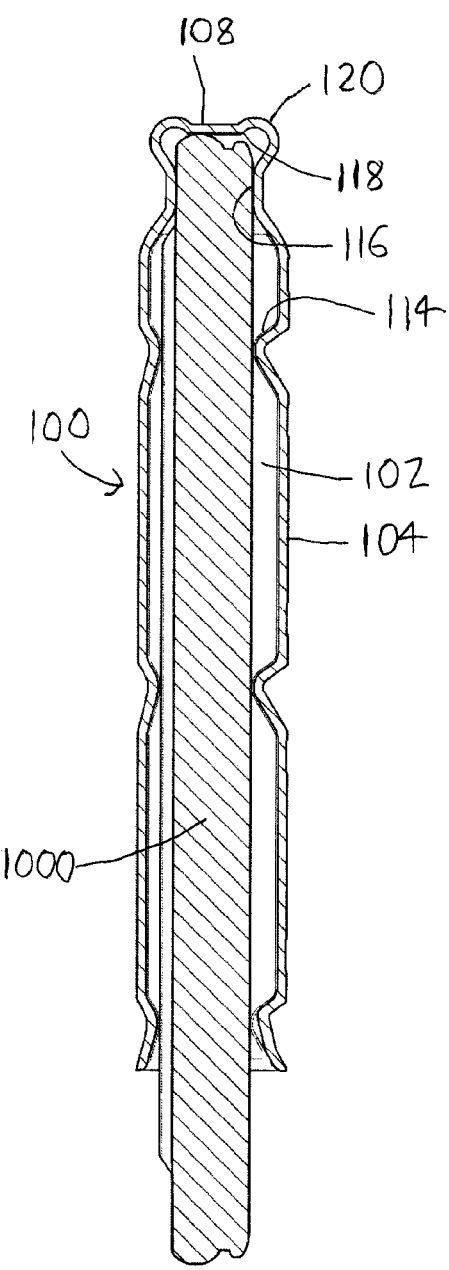

DOCK FOR PORTABLE ELECTRONIC DEVICES

FIELD OF THE INVENTION

This document concerns docks for receiving portable electronic devices (PEDs) such as portable computers, smartphones, and the like for purposes of charging and/or data communication.

BACKGROUND OF THE INVENTION

Portable electronic devices (PEDs), such as tablet computers, laptop computers, and smartphones, often bear connectors for charging and or data communication. At the time this document was prepared, such connectors are typically defined by Universal Serial Bus (USB) connectors, or similar proprietary connectors such as the Lightning connector of Apple Computers, wherein the PEDS bear onboard connectors in the form of female sockets. These onboard connectors connect to external connectors in the form of male plugs, which are typically provided at the ends of cables. The PEDs can thus be charged, and/or connected to other devices for data interchange, by simply inserting the appropriate cabled male plug external connectors into the female socket onboard connectors of the PEDs. The external connectors are often provided within docks, whereby a PED may be inserted into a cavity in the dock which is configured to complementarily receive the PED. Insertion of the PED aligns its onboard connector with the external connector within the cavity, such that full insertion of the PED into the cavity connects the onboard and external connectors (e.g., the male plug external connector within the dock's cavity is received within the female socket onboard connector of the inserted PED).

Problems can arise with such docks when their external connectors do not precisely align with the onboard connectors of the PEDs the docks are to receive. The external connector within the cavity of the dock protrudes from a cavity wall, and as a PED is inserted within the dock cavity, the external connector is received within the onboard connector when the connectors are properly aligned. However, when the connectors are misaligned, the inserted PED is urged against the protruding external connector within the dock cavity, and can deform the external connector and/or generate stress on the dock where the external connector is mounted. This can lead to damage to the external connector and its dock (and/or to the PED and its onboard connector), rendering them difficult to use, inoperative, and/or unsightly. This problem can arise, for example, when a PED is misinserted, when a PED is inserted within an incompatible dock, or when a foreign object is present in the dock when the PED is inserted.

SUMMARY OF THE INVENTION

The invention is directed to a dock which is intended to at least partially alleviate the aforementioned problems. To give the reader a basic understanding of some of the advantageous features of the invention, following is a brief summary of a preferred version of the dock, with reference being made to FIGS. 1A-1O of the accompanying drawings (which are briefly reviewed in the "Brief Description of the Drawings" section of this document below) to assist the reader's understanding. Since the following discussion is merely a summary, it should be understood that more details regarding different versions of the dock may be found in the Detailed Description set forth below in this document. The claims at the end of this document then define the various versions of the dock in which exclusive rights are secured.

The dock 100 is configured for charging of, and/or data communication with, a personal electronic device (PED) 1000 having an onboard connector configured for charging of and/or data transfer with the PED 1000. The dock 100 includes a dock cavity 102 bounded by a cavity wall, which is preferably defined by opposing dock sidewalls 104 with a rear dock wall 108 extending therebetween, such that the dock cavity 102 may receive a PED 1000 inserted therein. An external connector 50 is provided within the dock cavity 102, and is configured to connect to the PED's onboard connector when the PED 1000 is inserted within the dock cavity 102. The dock 100 then preferably has one or more of the following features:

(1) Within the cavity, the external connector 50 is resiliently biased (e.g., spring-loaded) to protrude from the cavity wall, and is aligned to connect with the PED's onboard connector upon proper insertion of the PED 1000 (FIG. 1H), thereby allowing charging of, and/or data communication with, the properly-inserted PED 1000. However, if the PED 1000 is improperly inserted, and/or if its onboard connector is damaged or otherwise abnormal such that it cannot connect with the PED's onboard connector, the external connector 50 yields to the force of the inserted PED 1000 and retracts within the cavity wall (FIG. 1I) rather than forcefully bearing against the PED 1000 (which can damage the external connector 50 and/or the PED 1000). The external connector 50 therefore avoids damage when it cannot connect to the onboard connector of the inserted PED 1000.

(2) To provide the arrangement of feature (1) above, the rear dock wall 108 may include a connector passage 124 (FIG. 1F) extending rearwardly therefrom, and having the external connector 50 situated therein. The external connector 50 is then movable within the connector passage 124 such that it can protrude from, and retract within, the rear dock wall 108. Preferably, a spring 142 is situated within the connector passage 124, with the spring 142 resiliently biasing the external connector 50 to protrude from the rear dock wall 108. A connector conduit 122 may protrude rearwardly from the rear dock wall 108, and may have the connector passage 124 defined therein. A cap 126 can then be provided which fits over the connector conduit 122, and which has a connector aperture 140 configured to pass the external connector 50 through the cap 126 and into the connector passage 124. The spring 142 is then provided between the cap 126 and the external connector 50 to urge the external connector 50 forwardly within the connector passage 124. As seen in FIG. 2B, the spring 242 may act on the external connector 50 via a plunger 254 which extends into the cap 226, with the spring 242 being situated between the plunger 254 and the cap 226 to resiliently bias the plunger 254 into the connector passage 224.

(3) The rear dock wall 108 is configured to resiliently yield rearwardly in response to any pressure from the inserted PED 1000 (e.g., to displace rearwardly under impact from a forcefully-inserted PED 1000), and thereafter move forwardly to its original location when such pressure is relieved. This is preferably done by connecting the dock sidewalls 104 to the rear dock wall 108 by corners 120 (FIG. 1M) that extend concavely from the rear dock wall 108 out of the dock cavity 102 (and preferably extending along an arcuate path). Where the dock 100 is formed of resiliently flexible plastic or another resiliently flexible material, this arrangement allows the rear dock wall 108 to flex rearwardly when subjected to pressure/impact, and then spring 142 forwardly when pressure is relieved.

(4) The rear dock wall 108 is preferably spaced from the dock floor 106 (and from any dock 100 ceiling that might be provided between the dock sidewalls 104 opposite the dock floor 106) as exemplified by FIG. 1K, such that the rear dock wall 108 is only connected to the dock sidewalls 104. This feature, which is preferably provided in conjunction with feature (3) above, decreases the effective rigidity of the rear dock wall 108 and helps it better absorb the pressure/impact of a forcefully-inserted PED 1000.

(5) As also seen in FIG. 1K, the cavity width (the distance between the dock sidewalls 104) is preferably narrowest adjacent the corners 120 joining the dock sidewalls 104 to the rear dock wall 108s (that is, the cavity width is at its narrowest at a location immediately forward of the rear dock wall 108), and is sized at this location to closely engage the PED 1000 for which the dock 100 is designed. The PED 1000 is therefore readily insertable/slidable within the dock cavity 102 until it nears full insertion (as it approaches the rear dock wall 108), at which point it is grasped 1000 between the dock sidewalls 104, and is directed such that its onboard connector is aligned with any external connector 50 on the rear dock wall 108. Preferably, the dock sidewalls 104 converge inwardly into the dock cavity 102 as they extend rearwardly toward the rear dock wall 108, but then diverge outwardly immediately prior to the rear dock wall 108 such that the dock sidewalls 104 join the rear dock wall 108 at corners 120 that extend concavely from the dock sidewalls 104 out of the dock cavity 102. As with the corners 120 of feature (3) above, these corners 120 preferably extend along an arcuate path. This arrangement allows the dock sidewalls 104 to flex outwardly adjacent the rear dock wall 108 as needed as the PED 1000 is grasped 1000 between the sidewalls 104.

(5) The dock sidewalls 104 each include at least one indent 114 (see, e.g., FIG. 1A) spaced forwardly from the rear dock wall 108, and which protrudes inwardly into the dock cavity 102. Such indents 114 are preferably situated opposite each other on the opposing dock sidewalls 104, and are preferably configured as elongated ridges extending at least substantially parallel to the rear dock wall 108. These indents 114 are preferably spaced across the cavity width such that they closely rest adjacent the PED 1000 which the dock 100 is designed to receive, but they do not positively engage the PED 1000. The indents 114 thereby serve to at least coarsely direct an inserted PED 1000 such that its onboard connector is aligned (or nearly so) with an external connector 50 situated on the rear dock wall 108. This feature is useful with feature (5) noted above: as a PED 1000 is inserted with the dock cavity 102, the indents 114 initially serve to coarsely align the PED 1000 to dock 100 with the external connector 50, with the narrowed cavity width then serving to finely align the PED 1000 as it nears full insertion.

(7) As seen in FIGS. 1N and 1O, each dock 100 sidewall is preferably configured to engage the opposing dock 100 sidewall, whereby two or more docks 100 may be engaged at their sidewalls to form an array of docks 100. This arrangement is preferably provided by situating one or more protruding male members 148 on one of the dock's sidewalls outside the dock cavity 102, and one or more complementary female sockets 150 on the opposite dock 100 sidewall. Thus, the male member 148 of one dock 100 can be received within the female socket 150 of an adjacent dock 100 to affix the docks 100 together, with additional docks 100 being likewise attachable.

(8) As seen in FIGS. 2E and 2F, where the dock 200 is to be used with a PED 1000 which bears a charging indicator lamp (an LED or the like which illuminates when the PED 1000 establishes a charging connection with an external connector 50), the dock 200 may also include a charging indicator assembly 264 which transmits light from the PED's charging indicator lamp to the dock front 210 (or to another suitably visible location on the dock 100). The charging indicator assembly 264, which may take the form of a light pipe 266 having a first end 268 situated on the rear dock wall 108 and an opposing second end 270 situated near the dock front 210, therefore displays to a user that a PED 1000 inserted within the dock 200 has successfully established a charging connection with the external connector 50 within the dock's cavity 202.

Further potential advantages, features, and objectives of the invention will be apparent from the remainder of this document in conjunction with the associated drawings.

BRIEF DESCRIPTION OF THE DRAWINGS

FIGS. 1A and 1B are isometric views of an exemplary dock 100 for a personal electronic device (PED 1000), with the dock 100 having an external connector 50 installed therein for charging of, and/or data communication with, a PED 1000 inserted in the dock cavity 102 (with only the cable 54 of the external connector 50 being visible).

FIG. 1C is a front elevational view of the dock 100, showing the male plug 52 of the external connector 50 protruding from the rear dock wall 108 into the dock cavity 102.

FIG. 1D is a rear elevational view of the dock 100, showing the cap 126 fit on the rear dock wall 108, with the cable 54 of the external connector 50 extending through the cap's connector aperture 140.

FIG. 1E depicts an exemplary PED 1000 ready for insertion within the dock 100.

FIG. 1F depicts the PED 1000 fully inserted in the dock 100, with the external connector 50 being shown removed from the connector conduit 122 at the rear dock wall 108 (and with the cap 126 and springs 142 used to retain the external connector 50 within the dock 100 being shown removed from the connector conduit 122 and disassembled).

FIG. 1L is a plan view of the top of the dock 100, showing the PED 1000 fully inserted in the dock cavity 102.

FIG. 1M provides a cross-sectional view of the dock 100 and PED 1000 depicted in FIG. 1L.

DETAILED DESCRIPTION OF EXEMPLARY VERSIONS OF THE INVENTION

Figure 1G:
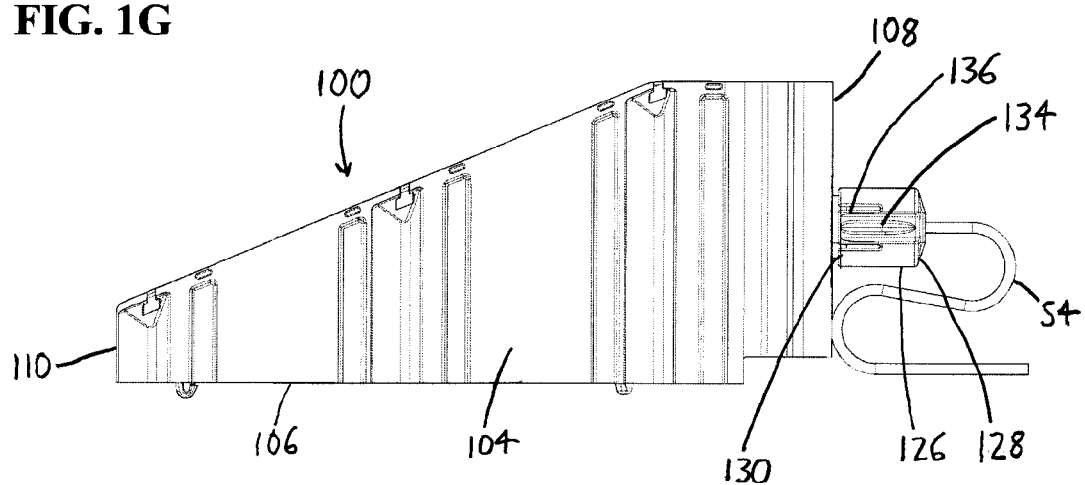
FIG. 1G is a side elevational view of the dock 100, showing the external connector 50 installed in the dock 100 and maintained therein via the cap 126.
Figure 1H:
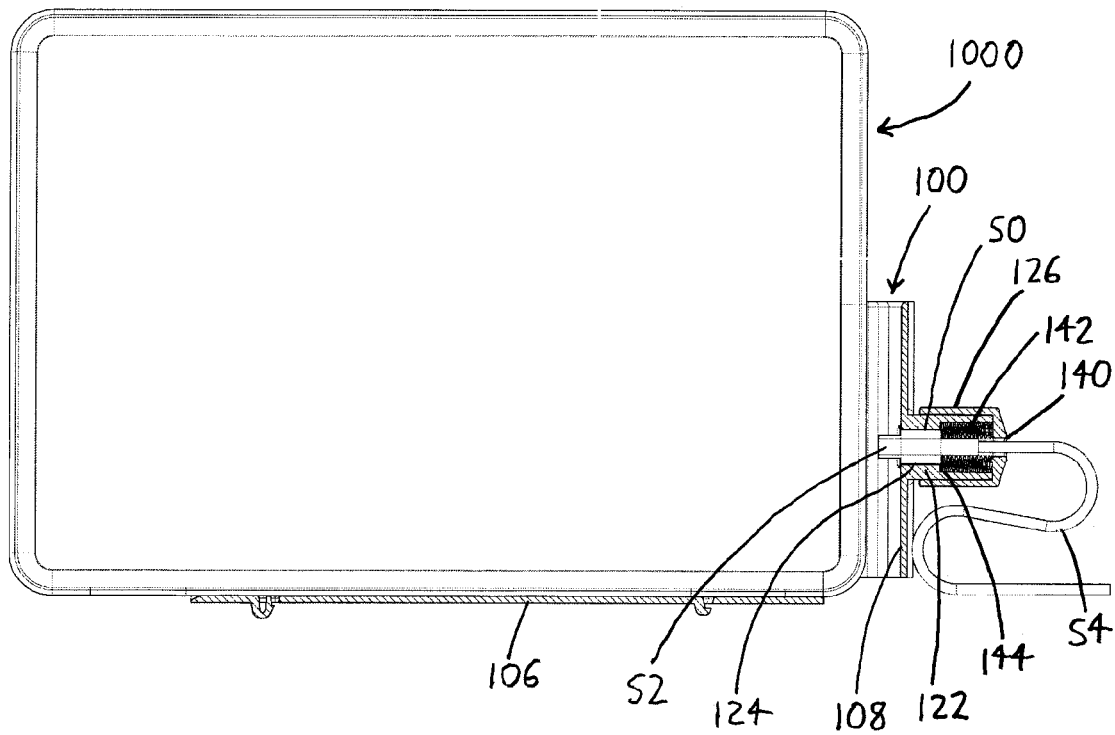
FIG. 1H provides a cross-sectional view of the dock 100 depicted in FIG. 1G, shown with a PED 1000 almost fully inserted within the dock 100, and showing the external connector 50 (more particularly its male plug 52) biased forwardly of the rear dock wall 108 via the springs 142.
Figure 1I:
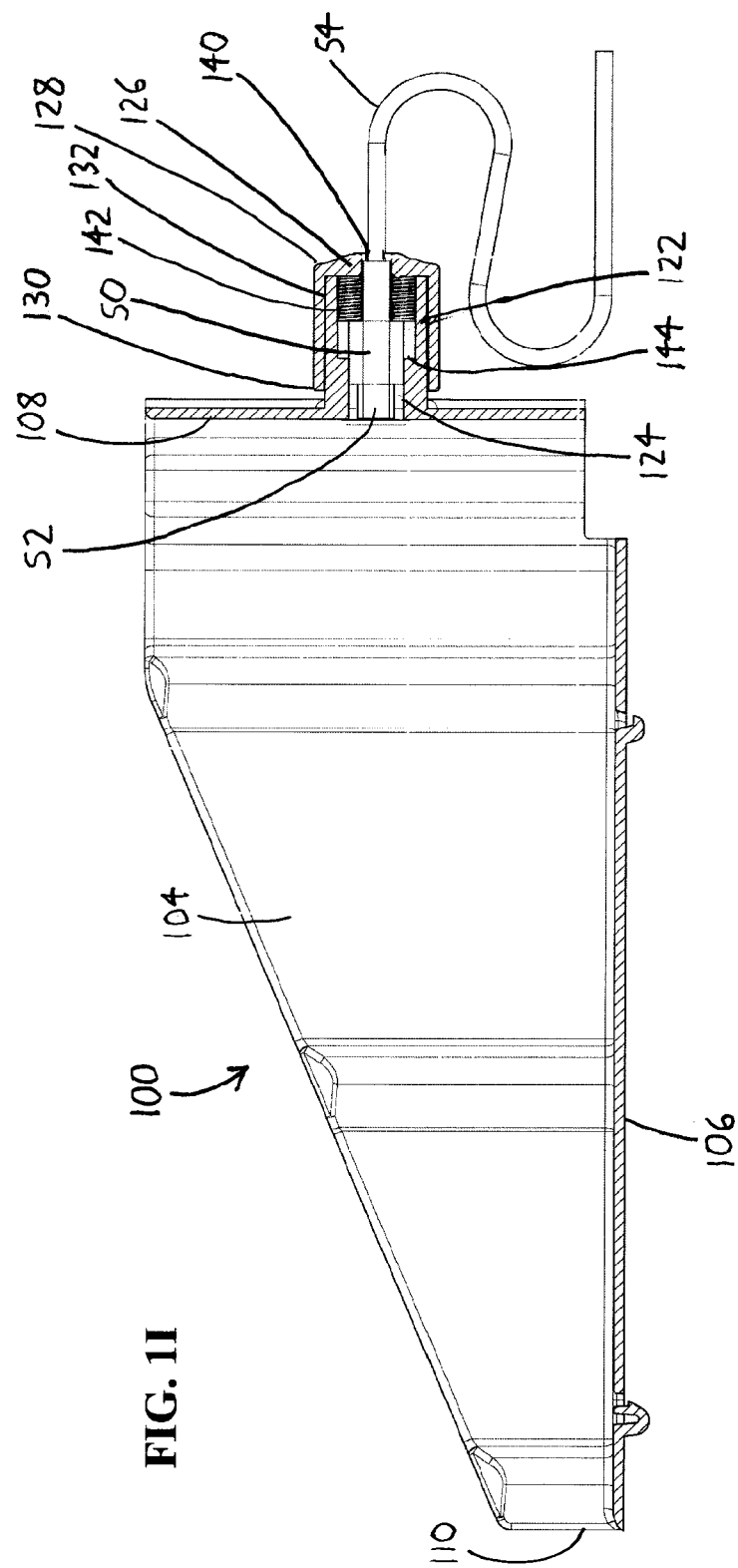
FIG. 1I provides a cross-sectional view of the dock 100 as depicted in FIG. 1H, shown without the PED 1000, and illustrating the withdrawal of the external connector 50 into the rear dock wall 108 when the external connector 50 fails to engage the PED's onboard connector upon full insertion of the PED 1000.
Figure 1J:
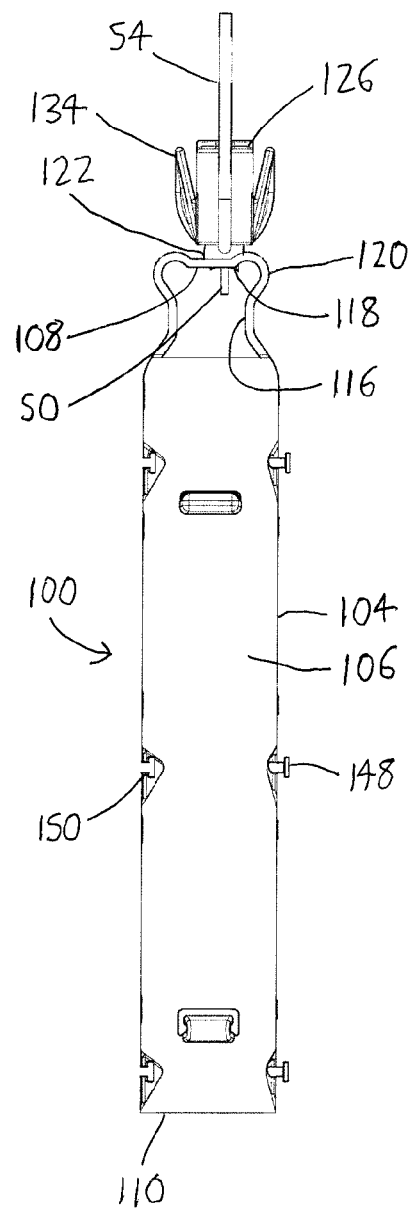
FIG. 1J is a plan view of the bottom of the dock 100.
Figure 1K:
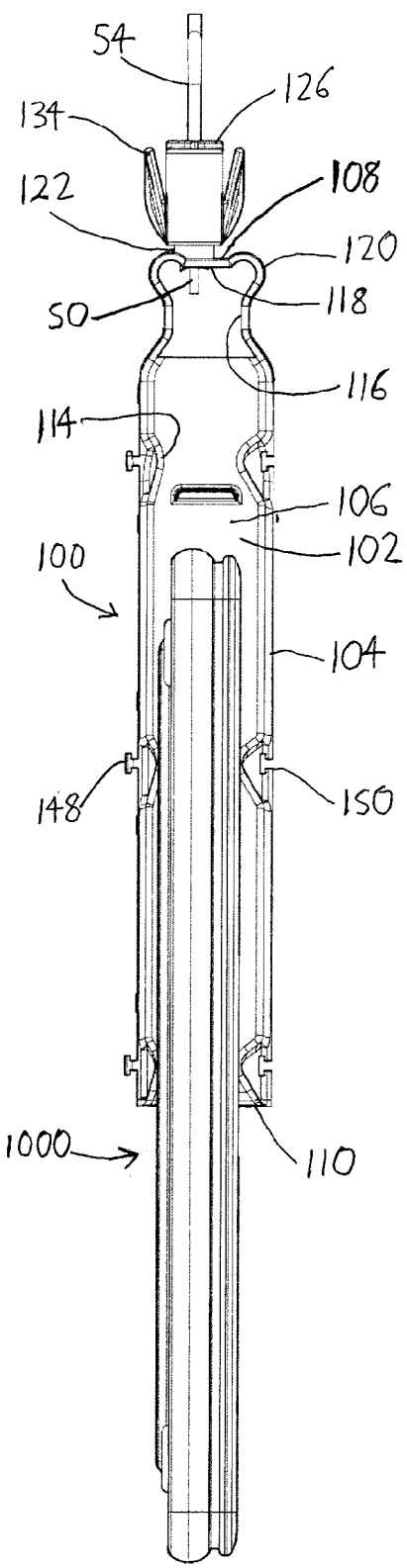
FIG. 1K is a plan view of the top of the dock 100, showing the PED 1000 partially inserted in the dock cavity 102.
Figure 1N:
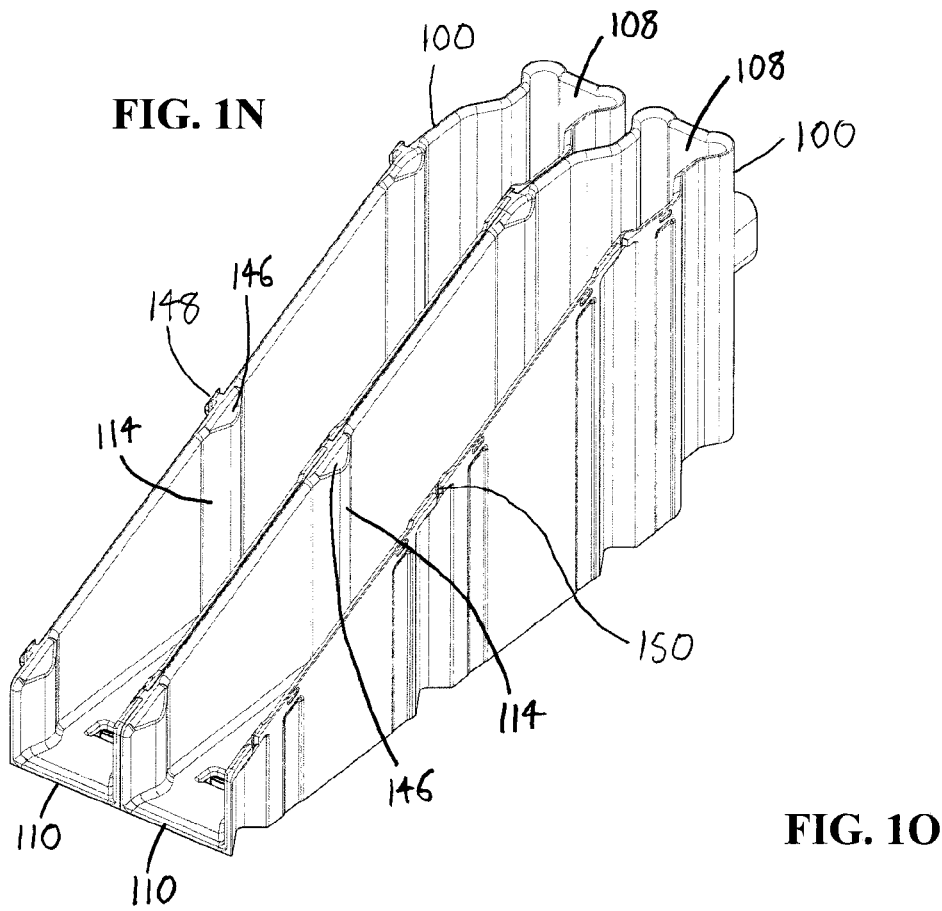
FIG. 1N illustrates a pair of docks 100 connected in an array.
Figure 1O:
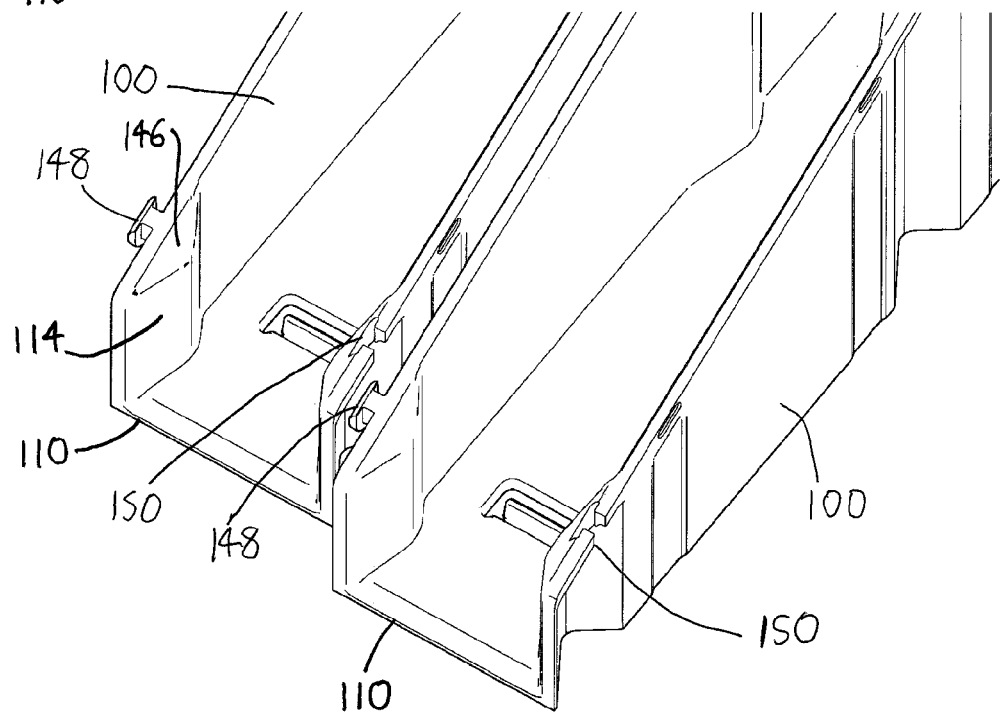
FIG. 1O provides a detailed view of the fronts 110 of the docks 100 of FIG. 1N, showing a male member 148 on the sidewall 104 of one dock 100 prior to engagement with a female socket 150 on the sidewall 104 of the other dock 100.

FIGS. 1A-1O illustrate a first exemplary version of a dock 100. Referring particularly to FIGS. 1A and 1B, the dock 100 has a dock cavity 102 bounded by opposing dock sidewalls 104 connected by a bottom dock wall 106 and a rear dock wall 108, with the bottom dock wall 106 extending from an open dock front 110 toward the rear dock wall 108. As seen in FIGS. 1E and 1F, a PED 1000 may be inserted within the dock cavity 102 from the open dock front 110 (and/or from the open dock top 112 defined between the dock sidewalls 104) to slide within the dock cavity 102 toward the rear dock wall 108, which bears an external connector 50 (see particularly FIGS. 1C and 1H-1K) for connecting with the PED's onboard connector (which is not shown in the drawings). The dock's walls 104/106/108 are configured, and the dock's external connector 50 is chosen and situated, such that as a particular brand and model of PED 1000 slides along the bottom dock wall 106 and dock sidewalls 104, the PED 1000 is guided toward the rear dock wall 108 with its onboard connector aligned with the dock's external connector 50. The PED's onboard connector will then connect to the dock's external connector 50 upon full insertion of the PED 1000, provided the connectors are in an undamaged and otherwise normal state.

The alignment of the PED 1000 with the dock's external connector 50 is performed, at least in part, by the dock sidewalls 104. As seen in FIGS. 1A-1B (and in the cross-section of FIG. 1M), the sidewalls 104 are corrugated, bearing vertically-extending ridges/indents 114 spaced along the depth of the dock 100 (from its open dock front 110 to the rear dock wall 108), and are preferably molded of substantially rigid, yet still somewhat flexible plastic (or other suitable material). The sidewall indents 114 of the first three sets of opposing indents have generally triangular/V-shaped profiles (see particularly FIGS. 1K-1M), with opposing indents 114 being spaced across the width of the dock cavity 102 such that they have only a small amount of clearance about the sides of a PED 1000 to be received within the dock cavity 102 (e.g., 1 mm of total clearance, or 0.5 mm from each indent 114 to the surface of a PED 1000 received between opposing indents 114). These initial sidewall indents 114 therefore present small contact surfaces to an inserted PED 1000, and serve to roughly laterally align an inserted PED 1000 with the external connector 50 on the rear dock wall 108. The final pair of opposing indents 116 prior to the rear dock wall 108 have roughly trapezoidal profiles, thereby presenting greater contact surfaces to an inserted PED, and these closely engage the surface of an inserted PED 1000, with the relatively low friction of the plastic indents 116 (and their flexure) allowing the final sidewall indents 116 to closely engage and more finely align the inserted PED 1000 with the external connector 50 on the rear dock wall 108.

As also seen in FIGS. 1K-1M, the rear dock wall 108 also bears a rear wall indent 118 with a roughly trapezoidal profile; in combination with the final sidewall indents 116, this gives the rear of the dock 100 (as seen at the tops of FIGS. 1K-1M) a "foliated" profile, roughly resembling half of a quadrifoil (quatrefoil) shape wherein the vertices of the quadrifoil are replaced with inwardly-indented planar faces 116 and 118, with these planar faces being joined by rounded corner "ears" 120 extending concavely out of the dock cavity 102 (and with the concave corners 120 and sidewall indents 114 being symmetrically situated about the rear wall indent 114). The rear of the dock 100 lacks a bottom dock wall 106 (see FIGS. 1I-1K), and thus the rear dock wall 108 and its adjacent portions of the dock sidewalls 104 are solely (or largely) defined by vertical surfaces extending continuously about the rear of the dock 100, without discontinuous sharp corners. Because the rear dock wall 108 is formed of flexible plastic, the rear wall indent 118 (and its adjoining corners 120) can yield under loading, as where a user rapidly inserts a PED 1000 into the dock 100 to forcibly impact the rear wall 108: the corners 120 bend to allow the rear wall indent 118 to displace rearwardly upon impact, and then resiliently urge the rear wall indent 118 forwardly when force is relieved. Forming the dock's rear wall 108 and sidewalls 104 such that they are symmetric about the dock's central lengthwise plane (i.e., a vertical plane bisecting the dock cavity 102, corresponding to the plane along which a PED 1000 is inserted into the dock cavity 102), as seen in FIGS. 1J-1M, is useful because this arrangement assists with alignment of the PED's onboard connector with the dock's external connector 50 regardless of the force of PED 1000 insertion: any deflection of the rear wall indent 118, and resulting deflection of the adjacent corners 120 and sidewalls 104, also tends to result in symmetric deformation of the sidewalls 104, maintaining the PED's onboard connector in the same lengthwise plane as the external connector 50 on the rear dock wall 108.

The overall arrangement of the dock sidewalls 104 and rear dock wall 108 provides several advantages. Because the initial sidewall indents 114 encountered by the PED 1000 do not engage (or at least do not closely engage) the PED 1000, and the final sidewall indents 116 closely engage and guide the PED 1000 toward the external connector 50, the dock 100 reduces scuffing of the outer surface of a PED 1000 following repeated insertions within, and removals from, the dock 100. Further, because the dock 100 is configured to accommodate forceful insertion of a PED 1000, the lifespan of the dock 100 is increased, and damage to an inserted PED 1000 is decreased.

The external connector 50 will typically take the form of a USB (Universal Serial Bus) Micro B, USB Type C, or Lightning male plug 52 (FIGS. 1H and 1I) having a cable 54 extending therefrom to a cable standard connector (not shown), typically a male USB Type A connector. As best seen in FIG. 1F, the rear dock wall 108 bears a rearwardly-extending connector conduit 122. The connector conduit 122 has a vertically-elongated connector passage 124 which narrows as it approaches and opens onto the dock cavity 102 (see FIG. 1C for a view of the external connector 50 within the connector passage 124 as the passage opens onto the dock cavity 102; also see FIGS. 1H and 1I for a view of the interior of the connector passage 124). The external connector 50 complementarily fits within the narrowed portion of the connector conduit 122, and can slide forwardly therein to protrude into the dock cavity 102 (FIG. 1H), and can slide rearwardly therein to retract from the dock cavity 102 (FIG. 1I).

A cap 126 (see particularly FIG. 1F-1L) may be situated over the connector conduit 122 to secure the external connector 50 within the connector passage 124. The cap 126 has an outer end 128 (FIG. 1I) and an opposing inner receiving end 130, wherein the cap inner receiving end 130 has an inner bore 132 configured to complementarily receive the connector conduit 122. The inner receiving end 130 of the cap 126 may be fit over the connector conduit 122, and affixed to the connector conduit 122 via finger-actuated levers 134 (see particularly FIGS. 1G and 1J-1L). These levers 134 are affixed near the cap inner receiving end 130 to the ends of flexible legs 136 (FIGS. 1F and 1G) defined along the circumference of the cap 126, and extend toward the cap outer end 128. The ends of the legs 136, near the cap inner receiving end 130, bear inner terminal prongs (not shown) which can fit into slots 138 defined on opposing sides of the connector conduit 122 (see particularly FIG. 1F). The cap 126 may therefore be slipped 1000 over the connector conduit 122 and affixed thereto as the prongs of the flexible legs 136 engage the slots. The cap 126 may thereafter be removed from the connector conduit 122 by depressing the levers 134, thereby flexing the legs 136 and releasing the prongs of the levers 134 from the slots 138 on the connector conduit 122, and then withdrawing the cap 126 from the connector conduit 122. The cap outer end 128 bears a connector aperture 140 having a horizontally-elongated shape configured to complementarily accommodate insertion of the external connector 50 (see particularly FIGS. 1D and 1F), with the connector aperture 140 opening into the bore 132 of the cap 126 (which is vertically elongated to accommodate the vertically-elongated connector conduit 122).

With the foregoing arrangement, the external connector 50 may be inserted through the connector aperture 140 at the cap outer end 128, and (after rotation) into the connector passage 124 within the connector conduit 122. As seen in FIGS. 1F, 1H, and 1I, springs 142 may then be installed in the connector passage 124 to urge against the edges of the rear side of the external connector 50. Lands 144 within the connector passage 124 (see FIGS. 1H and 1I, such lands 144 defining the narrowed portion of the connector passage 124) limit the travel of the springs 142 toward the dock cavity 102, and thus prevent the springs 142 from pushing the external connector 50 out of the connector passage 124. When the cap 126 is then installed on the connector conduit 122, the cap 126 sandwiches the springs 142 against the rear side of the external connector 50. The external connector 50 is therefore biased forwardly by the springs 142 to protrude from the connector conduit 122 into the dock cavity 102 (FIG. 1H), but can be urged rearwardly further into the connector conduit 122 if subjected to sufficient force from within the dock cavity 102 (as in FIG. 1I). Thus, when a PED 1000 is fully inserted into the dock cavity 102 (as seen in FIGS. 1F and 1L), the PED's onboard connector will engage the external connector 50 at the rear dock wall 108 if the onboard connector is properly aligned, and is undamaged (or so minimally damaged as to still allow connection with the external connector 50). However, if the PED's onboard connector is misaligned or otherwise so damaged that it will not engage the external connector 50, the PED 1000 will push the external connector 50 rearwardly to defeat the force of the springs 142, driving the external connector 50 into the connector conduit 122. This helps prevent damage to the external connector 50 if a user should try to urge the PED 1000 into connection with the external connector 50 when the PED 1000 is misaligned, or when its onboard connector is unsuitable for connection with the external connector 50.

Beneficially, the connector conduit 122 and cap 126 typically allow the dock 100 to accommodate installation of any external connector 50 (and associated charging or other components) that may be provided with a PED when received from its manufacturer. As an example, the Chromebook 3100 laptop computer provided by Dell Computer (Round Rock, Tex.) is typically provided with an external connector 50 which is cabled to a transformer and an electrical plug. The dock 100 may be configured to receive the Chromebook 3100 computer within its cavity 102, and the computer's external connector 50 may be installed within the dock's connector conduit 122 so that the dock 100 is ready for use with the computer. The dock's ability to use the external connector 50 originally designed for use with the PED 1000 better ensures that the external connector 50 provided by the dock 100 is fully compatible with the PED 1000 to be installed therein.

FIGS. 1N and 1O then illustrate how the dock 100 of FIGS. 1A-1M can be connected to one or more similarly-configured docks 100 to construct a multi-dock array. As noted previously, the dock sidewalls 104 bear vertically-extending indents 114 spaced along the depth of the dock 100 (from its open dock front 110 to the rear dock wall 108), with the initial indents 114 protruding into the dock cavity 102 to guide the surface of a PED 1000 when the PED is inserted within the dock cavity 102. Looking particularly to FIGS. 1A and 1B, the initial three sets of opposing inwardly-protruding indents 114 have a roughly triangular (V-shaped)

profile (see also FIG. 1M), and are defined by indent sidewalls connected by a roughly triangular downwardly-sloping ceiling 146 (which assists with insertion of a PED 1000 into the dock cavity 102 from the top of the dock cavity 102, and which can be omitted to enhance the flexibility of the indents 114). Above the indent ceilings 146 and along the top edges of the dock sidewalls 104, fasteners 148 (here male prongs) extend outwardly from the left side of the dock 100. At the right side of the dock 100, complementary fasteners 150 (here female valleys) descend from the top edges of the dock sidewalls 104 toward the indent ceilings 146, with the female valleys 150 being configured to complementarily receive the male prongs 148 of an adjacent dock 100 in snap-fit fashion (compare FIGS. 1N and 1O). Thus, users may connect any number of docks 100 side by side to create an array of PED-receiving docks 100. The number of docks 100 in the array can be increased or reduced as desired, which can be useful in educational, work, and other settings where numerous PEDs may be in use.

The initial sidewall indents 114 and dock fasteners (prongs 148 and valleys 150) provide several advantages. As noted previously, the initial indents 114 guide a PED inserted within the dock cavity 102, and provide coarse alignment of the PED with the external connector 50 (with the final sidewall indents 116 then engaging and finely aligning the PED). The indents 114 also provide rigidity to the dock sidewalls 104, particularly when docks 100 are connected in an array, allowing arrayed docks 100 to be easily handled as a unit with less flexure and "wobbliness." Additionally, an individual dock 100 may be easily removed from a multi-dock array and replaced with a substitute dock 100 without also requiring the removal of adjacent or other docks 100.

Beneficially, the dock 100 may be formed in large part of molded (and recyclable) plastic, making the dock 100 inexpensive to manufacture. The dock 100 is preferably formed of low-friction plastic or other material so as to ease insertion of PEDs, and to avoid or reduce scuffing and wear of inserted PEDs. These problems are particularly acute where PEDs have rubber/elastomeric trim/edging or bottom rests, as wear of these PED surfaces within a dock can eventually change the effective dimensions of the PEDs and hinder proper docking (i.e., engagement of a PED's onboard connector with the dock's external connector 50). Alternatively, a low-friction film (e.g., a polytetrafluoroethylene dry lube spray) may be applied to the dock 100, or at least to appropriate portions of its inner surface (such as indents 114/116). A preferred material for use for the dock 100 is acrylonitrile butadiene styrene (ABS) with polytetrafluoroethylene (PTFE) blended in, as this has been found to provide suitable friction characteristics.

The depicted dock 100 is configured to receive a particular model of Chromebook for storage, charging, and/or data exchange, but for other models or brands of PEDs having different dimensions and/or onboard connector locations, the dock 100 may be reconfigured with suitable dimensions and external connector locations for receipt of such PEDs. Ideally, all docks are configured to attach together regardless of the types of PEDs they are designed to receive. Docks for different PED brands/models may be differently colored, labeled, or otherwise designed with different appearances, such that users can associate docks having a particular appearance with a particular brand/model of a PED. Users can therefore construct dock arrays wherein the array can accommodate different PED brands/models. Such dock arrays can be constructed within charging cabinets and charging carts commonly used in educational and institutional settings, where multiple users each remove a PED from the dock array for use during classes or other events, and then return the PEDs to the dock array thereafter. When used in charging carts, the dock 100 addresses problems commonly encountered with prior cart docks: such docks were typically difficult to remove and replace with alternative docks that could accommodate different models of PEDs, and such docks additionally tended to transmit the impact of PED insertion to their carts, causing the cart to roll/displace as PEDs were inserted. The depicted dock's ability to be removed and replaced within dock arrays, and its yielding rear dock wall 108 and external connector 50, reduces or eliminates these problems.

FIGS. 2A-2K then illustrate an alternative dock 200 having many features similar to those of the dock 100, but using an alternative cap 226 (FIGS. 2A-2D) for installation on its connector conduit 222, and also having a charging indicator assembly 264 (FIGS. 2E-2K) which indicates to a user whether an inserted PED 1000 has successfully accomplished engagement of its onboard connector to the dock's external connector 50. Looking particularly to FIGS. 2A-2D, the cap 226 has an outer end 228 and an opposing inner receiving end 230, wherein the cap inner receiving end 230 is defined by opposing legs 236 extending from the cap outer end 228. The connector conduit 222 may be complementarily received within the cap interior 232 defined between the legs 236. Similarly to the cap 126 of dock 100, finger-actuatable levers 234 are affixed to the legs 236, which are resiliently flexible such that when the inner receiving end 230 of the cap 226 is fit over the connector conduit 222, terminal depressions 252 defined within the ends of the legs 236 (see particularly FIGS. 2B and 2C) engage prongs 238 protruding from opposing sides of the connector conduit 222. The cap 226 may therefore be slipped over the connector conduit 222 and affixed thereto via the legs 236 and their depressions 252. The cap 226 may later be removed from the connector conduit 222 by depressing the levers 234, thereby flexing the legs 236 outwardly until the prongs 238 of the connector conduit 222 disengage from the depressions 252 within the legs 236, and then withdrawing the cap 226 from the connector conduit 222.

The cap outer end 228 bears a connector aperture 240 (see particularly FIG. 2B) having a horizontally elongated shape through which the external connector 50 may be passed to the cap interior 232. Thus, similarly to the cap 126 of the dock 100, the external connector 50 may be inserted through the connector aperture 240 and then rotated for insertion into the (vertically-elongated) conduit connector passage 224, with installation of the cap 226 on the connector conduit 222 then preventing withdrawal of the external connector 50 from the connector conduit 222. As with the cap 126 of the dock 100, the cap 226 here bears springs 242 which urge the external connector 50 through the connector conduit 222 toward the dock cavity 202, but which allow the external connector 50 to retract within the connector conduit 222 when resistance is encountered. However, rather than having the springs 242 rest largely unconstrained within the connector conduit 222 (as in the dock 100), here the cap 226 uses spring-loaded plungers/pistons 254 for similar effect. As particularly seen in FIGS. 2B and 2C, springs 242 fit about the lengths of the plungers 254 between the cap 226 and enlarged plunger inner ends 256. These plunger inner ends 256 rest within the conduit connector passage 224 when the cap 226 is installed on the connector conduit 222. The opposing plunger outer ends 258 extend through passages in the cap 226, and bear circumferential grooves 260

Figure 2A:
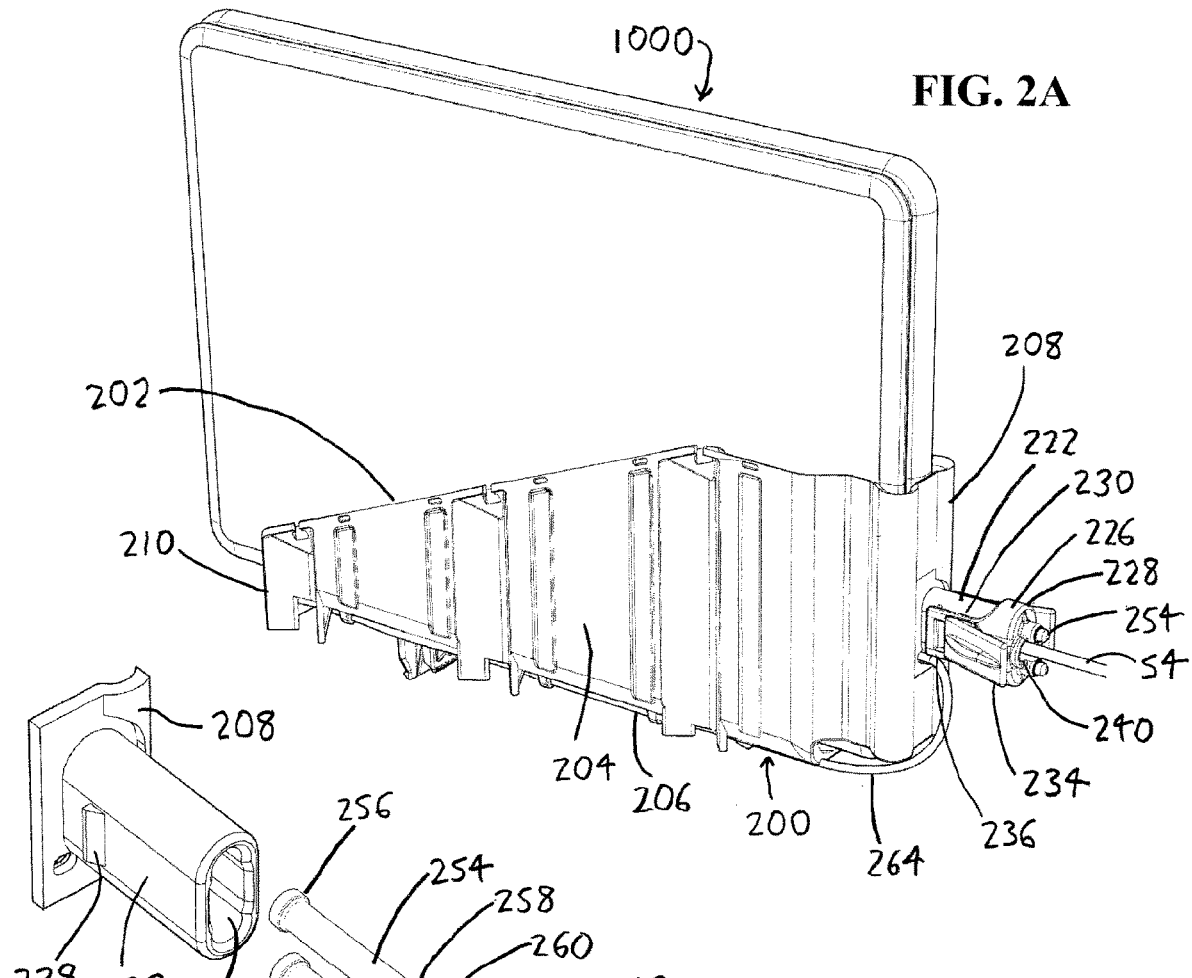
FIG. 2A is an isometric view of an alternative exemplary dock 200 for a PED 1000, wherein this dock 200 uses a cap 226 different from the one shown in FIGS. 1D-1L, and additionally has a PED charging indicator assembly 264 provided as a light pipe 266.
Figure 2B:
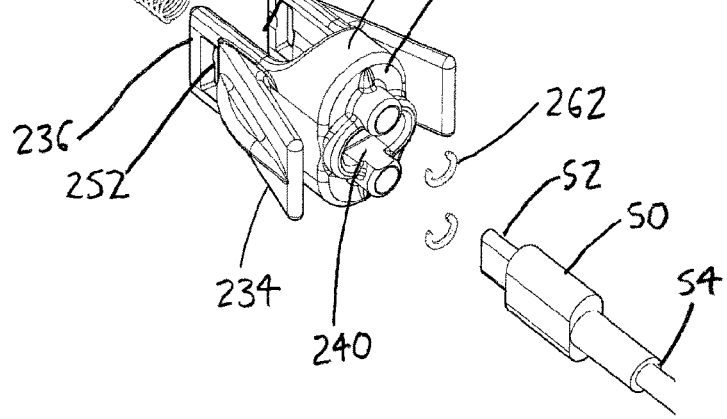
FIG. 2B is an exploded (disassembled) view of the cap 226 of FIG. 2A, shown with an external connector 50 to be fit through the cap 226 and inserted in the dock's connector conduit 222 (shown sectioned from the dock 200 of FIG. 2A).
Figure 2C:
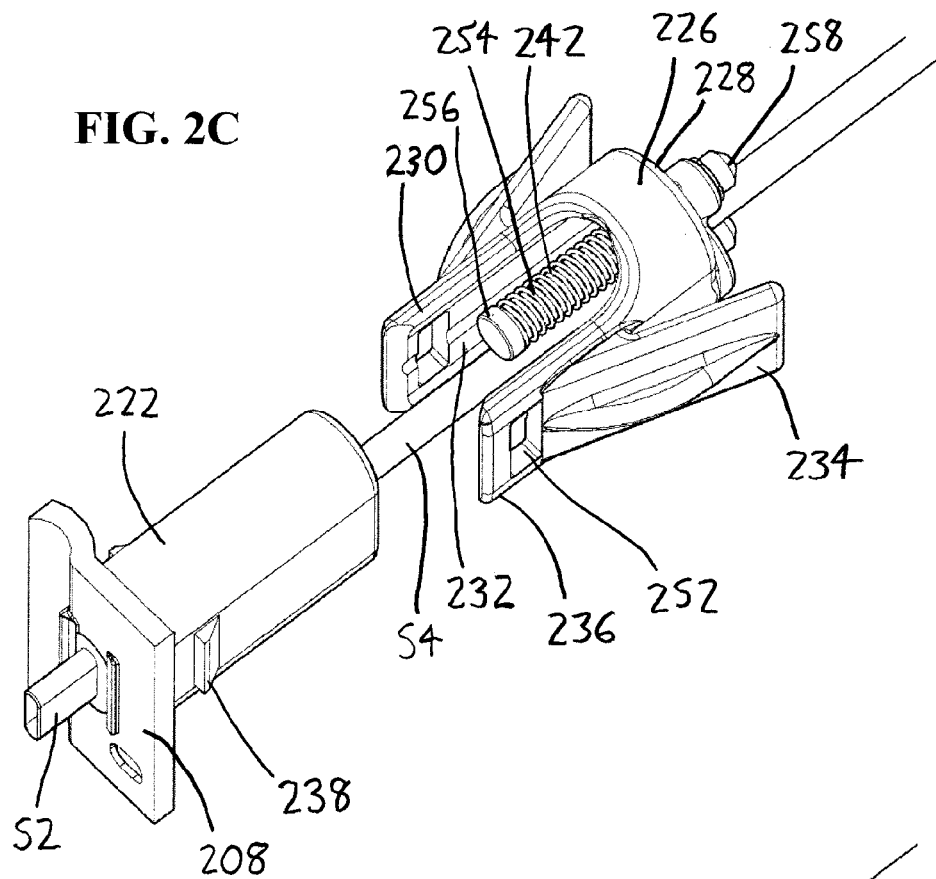
FIGS. 2C and 2D illustrate the installation of the cap 226 on the dock's connector conduit 222 (again shown sectioned from the dock 200 of FIG. 2A).
Figure 2D:
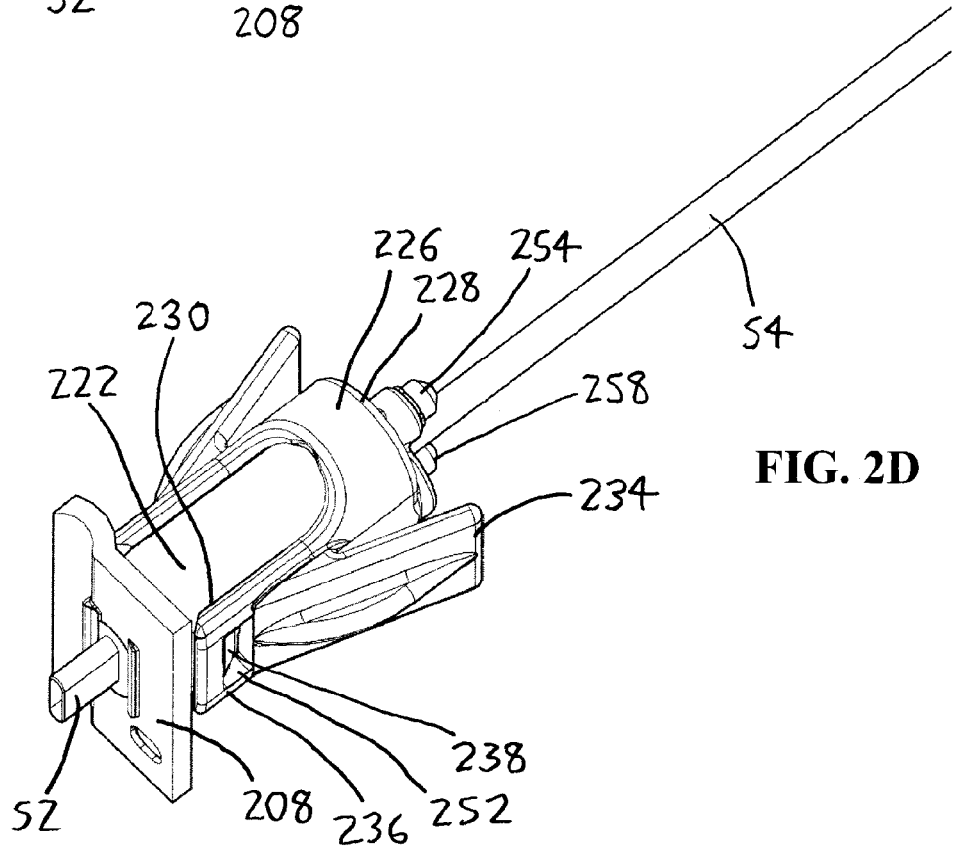
Figure 2E:
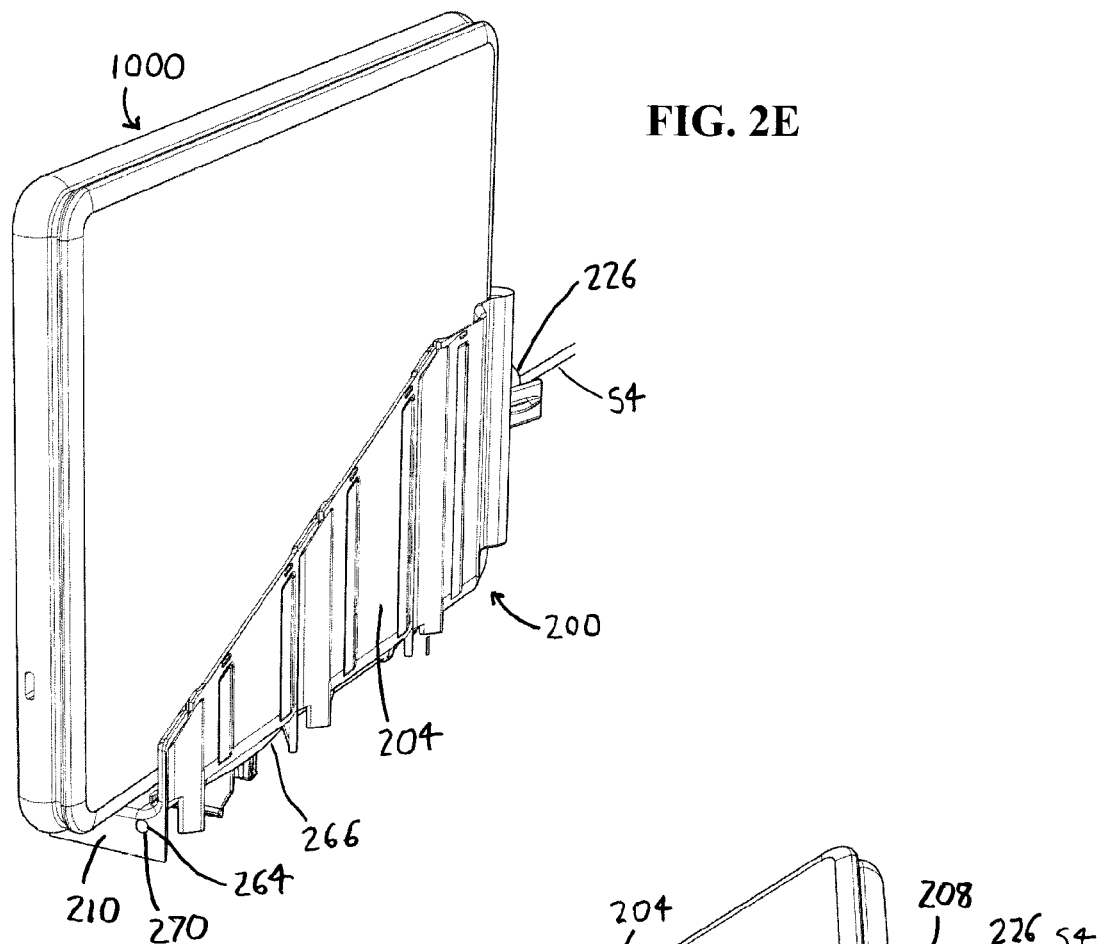
FIGS. 2E and 2F are views of the dock 200 of FIG. 2A from different angles, showing the charging indicator assembly 264 extending from the rear dock wall 208 adjacent the PED's charging indicator lamp to the front 210 of the dock 200.
Figure 2F:
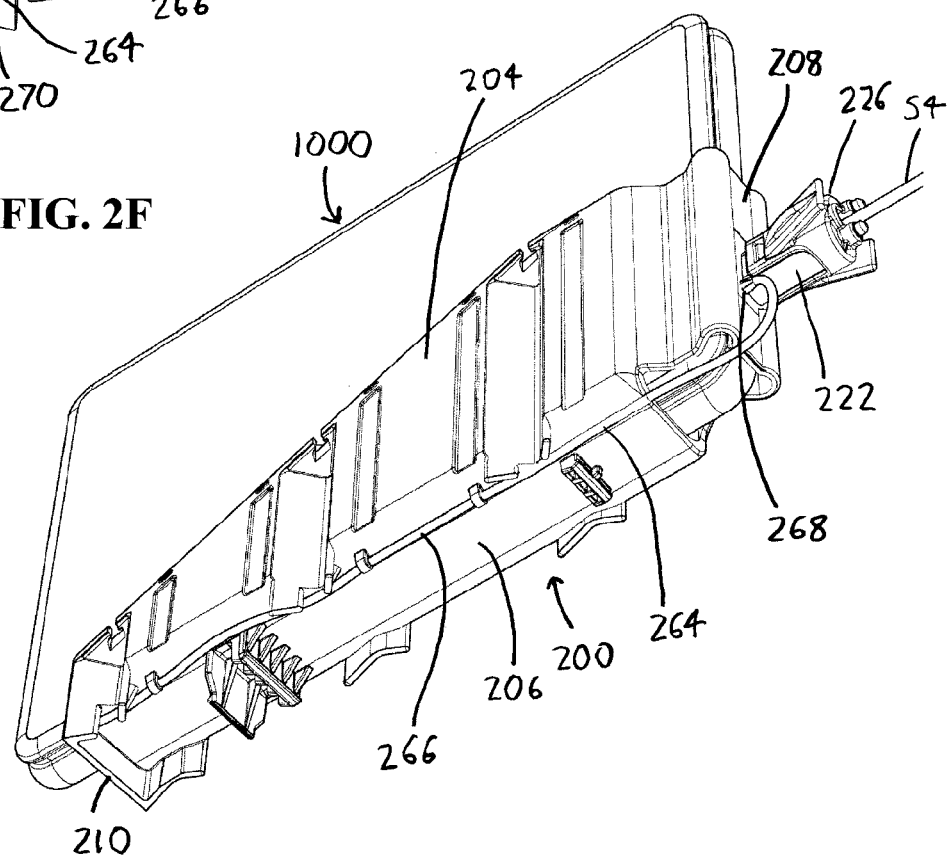
Figure 2G:
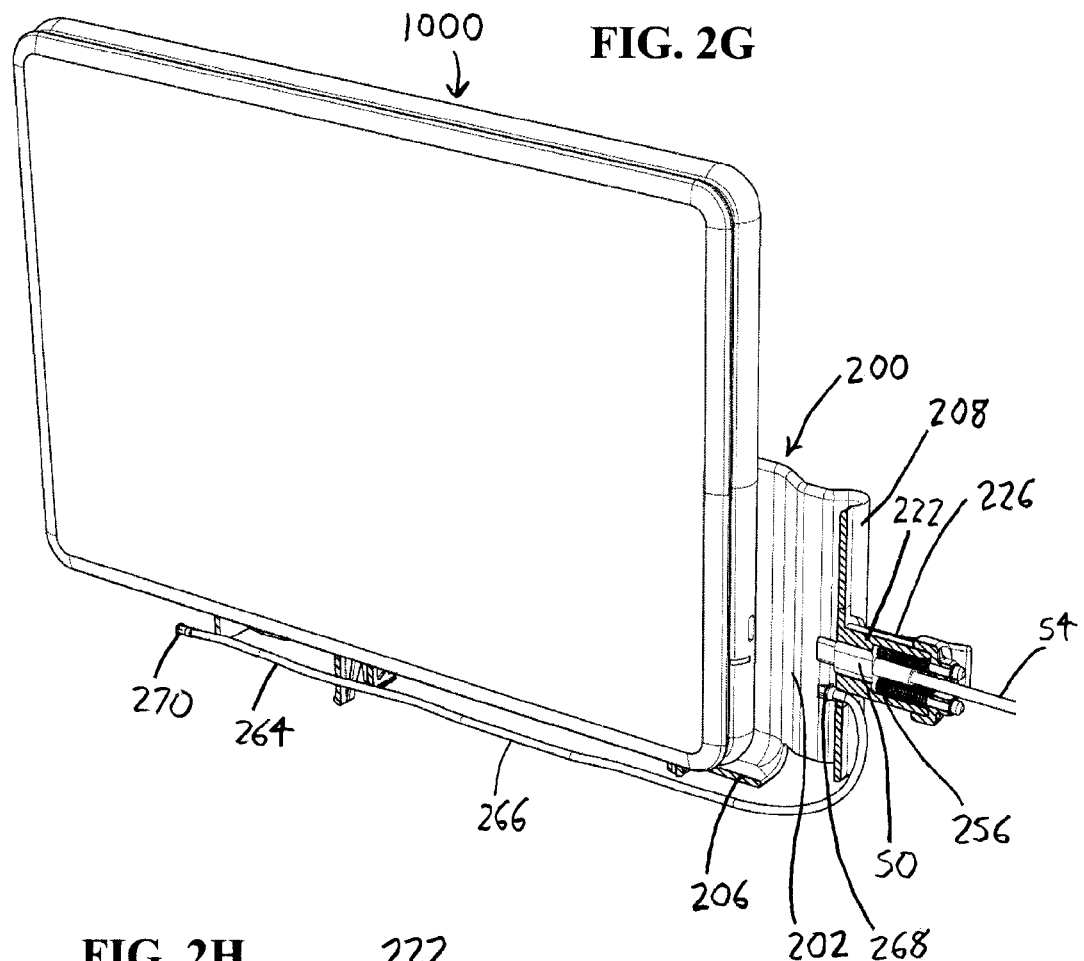
FIG. 2G is a sectional view of the dock 200 of FIG. 2A, showing the charging indicator assembly 264 extending from a light pickup 268 at the rear dock wall 208 to a light-emitting charging display 270 at the dock front 210, and shown with a PED 1000 partially inserted.
Figure 2H:
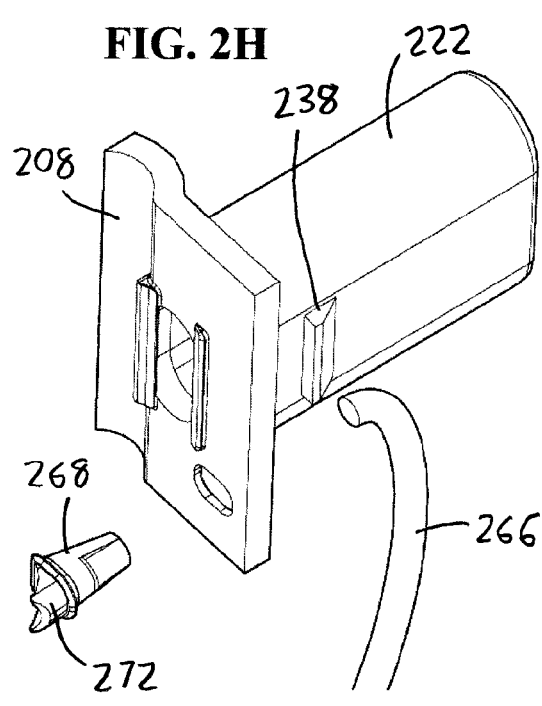
FIG. 2H depicts the connector conduit 222 of the dock 200 of FIG. 2A shown sectioned from the remainder of the dock 200, and showing the charging indicator assembly 264 and light pickup 268 prior to installation on the rear dock wall 208 adjacent the connector conduit 222.
Figure 2I:
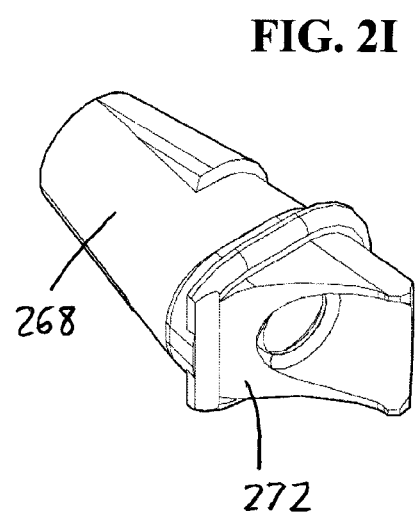
FIG. 2I depicts the light pickup 268 of FIGS. 2G and 2H.
Figure 2J:
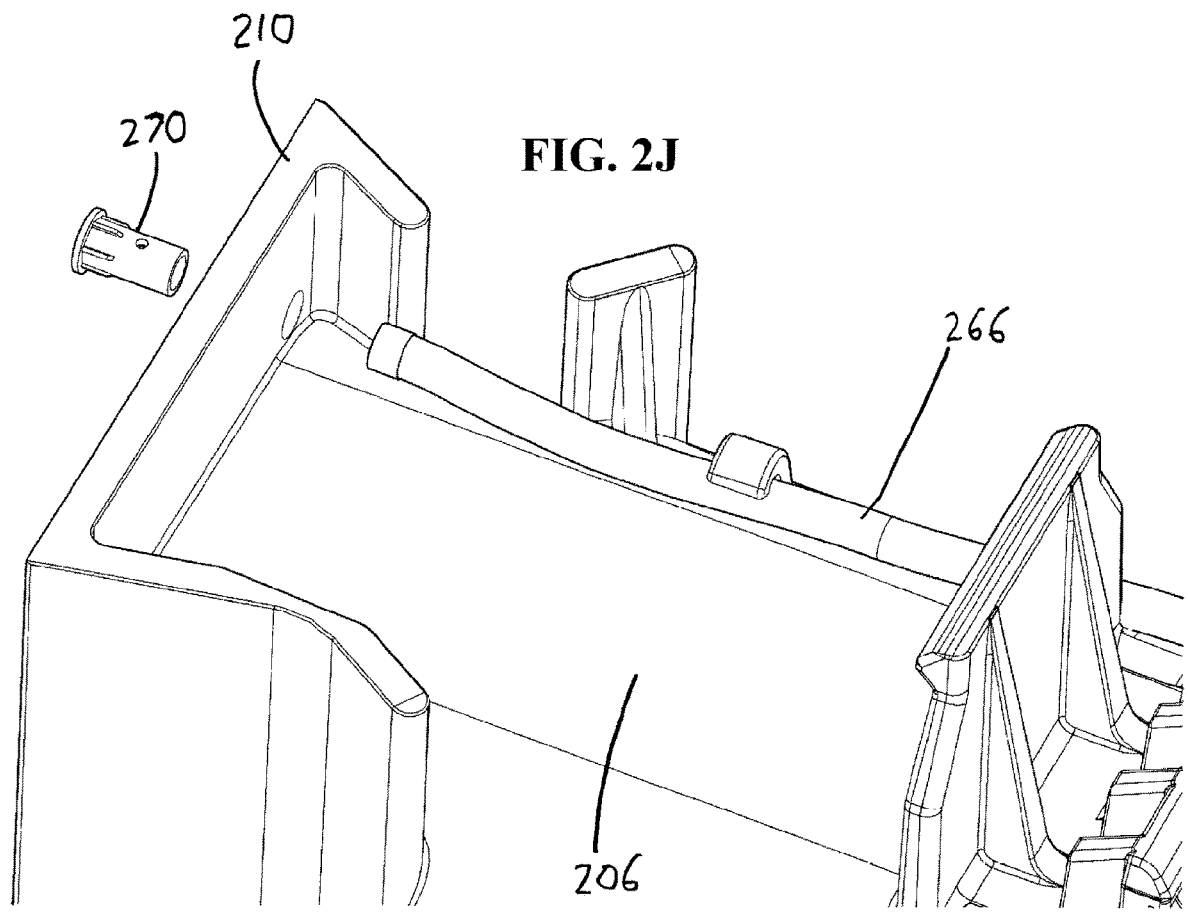
FIG. 2J depicts the charging indicator assembly 264 and charging display 270 of FIGS. 2G and 2H prior to installation on the dock front 210.

(FIG. 2B) wherein split rings/washers 262 may be installed to prevent the springs 242 (which are sandwiched between the cap 226 and the enlarged plunger inner ends 256) from retracting the plunger outer ends 258 through the plunger passages in the cap 226. The springs 242 therefore urge the plunger inner ends 256 toward the dock cavity 202, with the travel of the plungers 254 ultimately being limited by the split rings/washers 262. Thus, when the cap 226 is installed on the connector conduit 222 with the plunger inner ends 256 bearing against the edges of the rear side of the external connector 50 (as seen in FIG. 2G, similar to the manner in which the springs 142 bear against the external connector 50 in FIGS. 1H and 1I), the plunger inner ends 256 bias the external connector 50 into the dock cavity 202, but allow the external connector 50 to retreat into the connector conduit 222 if subjected to sufficient force from within the dock cavity 202. Thus, when a PED 1000 is inserted into the dock cavity 202, the PED's onboard connector will engage the external connector 50 at the rear dock wall 208 if the onboard connector is properly aligned, and is undamaged (or so minimally damaged as to still allow connection). However, if the PED's onboard connector is misaligned or otherwise so damaged that it will not engage the external connector 50, the PED 2000 will push the external connector 50 to defeat the force of the plungers 254, driving the external connector 50 out of the dock cavity 202 and into the connector conduit 222. This arrangement avoids damage to the external connector 50 if a user should try to urge the PED 1000 into connection with the external connector 50 when the PED 1000 is misaligned, or when its onboard connector is unsuitable for connection with the external connector 50.

Figure 2K:
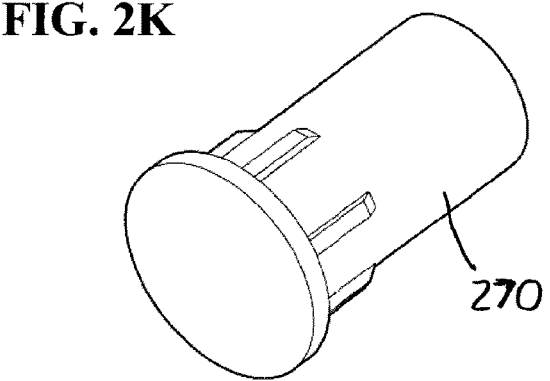
FIG. 2K depicts the charging display 270 of FIGS. 2G and 2J.

FIGS. 2A and 2E-2K then illustrate an exemplary charging indicator assembly 264 that may be used with any of the aforementioned docks, or other docks as well. Most PEDs bear a charging indicator lamp (typically an LED) which illuminates when the PED is charging. Looking particularly to FIGS. 2E-2G, the dock 200 bears a light pipe 266, e.g., one or more optical fibers or other light-transmitting members with high internal reflectivity, having a first end (a translucent charging indicator pickup 268, FIGS. 2F and 2G) situated on the inner dock sidewalls, here on the inner rear dock wall 208 adjacent the charging indicator lamp of the inserted PED 2000 for which the dock 200 is designed for use. The opposing second end of the light pipe 266 bears a translucent charging display 270 (FIGS. 2E and 2G) situated at the front of the dock 200. Thus, when a PED 2000 is inserted within a dock 200 and makes a charging connection with the external connector 50 within the dock 200, the PED's charging indicator lamp illuminates, and the light from the charging indicator lamp is collected by the charging indicator pickup 268, transmitted through the light pipe 266, and emitted through the charging display 270 at the dock front 210 to indicate that the charging connection has been successfully made. As particularly seen in FIG. 2G, as well as FIG. 2H (which depicts a section of the dock 200 about the connector passage 224 as the passage opens onto the dock cavity 202, along with the charging indicator pickup 268 and light pipe 266 disassembled/exploded from the dock section), the charging indicator pickup 268 is situated on the dock rear wall 208 such that the PED 2000, when inserted within the dock 200, has its charging indicator lamp rest next to the charging indicator pickup 268. Looking particularly to FIG. 2I, the charging indicator pickup 268 is defined as a tubular sleeve which snap-fits into the dock rear wall 208, and which fits about the first end of the (optical fiber) light pipe 266. The charging indicator pickup 268 preferably has an inner pickup end 272 configured to complementarily fit about the outer surface of the PED 2000 to surround its charging indicator lamp, whereby light from the illuminated lamp is channeled into the first end of the light pipe 266 within the charging indicator pickup 268. As seen particularly in FIGS. 2E-2G and 2J, the light pipe 266 then extends from the charging indicator pickup 268 to the dock front 210, where it fits within a charging display 270 protruding from a lip which descends from the bottom dock wall 206 (see FIGS. 2E and 2J). As seen in FIG. 2K, the charging display 270 is defined by a translucent member which fits over the light pipe 266, and serves as a lens for emitting light transmitted from the PED's charging indicator lamp through the light pipe 266. Thus, when a PED 2000 is inserted within the dock 200 and achieves a successful charging connection with the external connector 50 therein, causing its charging indicator lamp to illuminate, a user can see this via the charging display 270, indicating to the user that connection is successful.

A charging indicator arrangement such as that of FIGS. 2A and 2E-2K can be used in a dock having virtually any configuration, with its charging indicator pickup 268 and charging display 270 configured and placed as needed, and with the light pipe 266 therebetween having any suitable length. The charging indicator pickup 268 and charging display 270 need not be formed of components affixed to the light pipe 266, and could simply be defined by ends of the light pipe 266. Moreover, the light pipe 266 need not be an optical fiber or fibers, and could be formed by any translucent members (solid or hollow) having suitable internal reflectivity, including rigid translucent members having reflective coatings, tubes filled with light-transmitting media, and so forth.

Figure 3A:
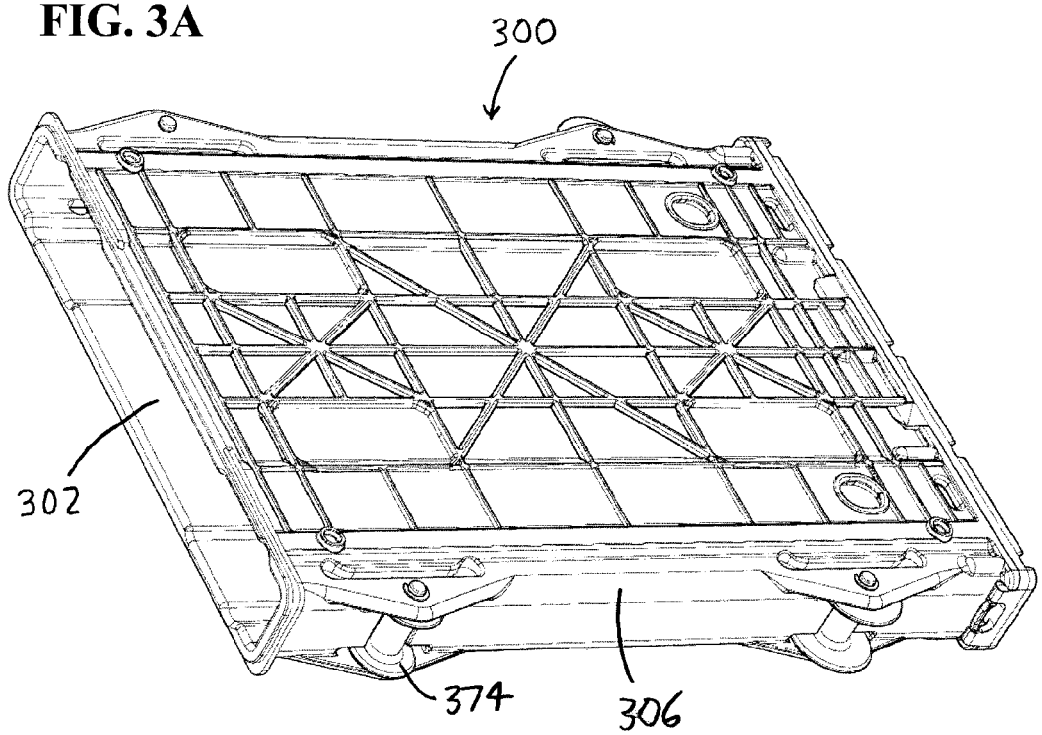
FIGS. 3A and 3B depict another exemplary dock 300 from different angles.
Figure 3B:
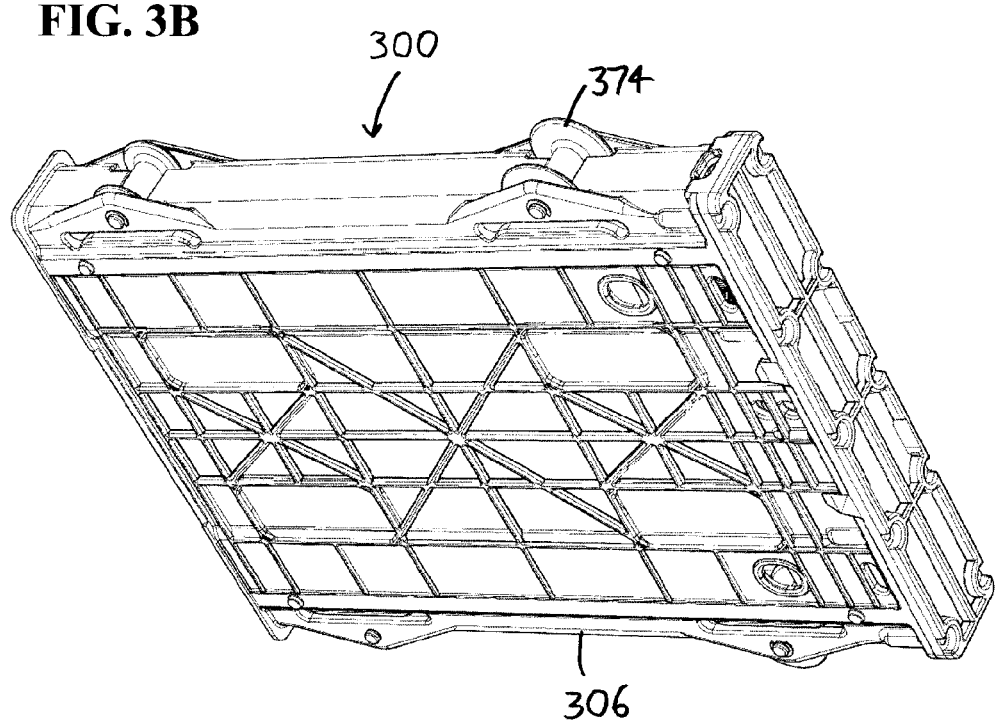
Figure 3C:
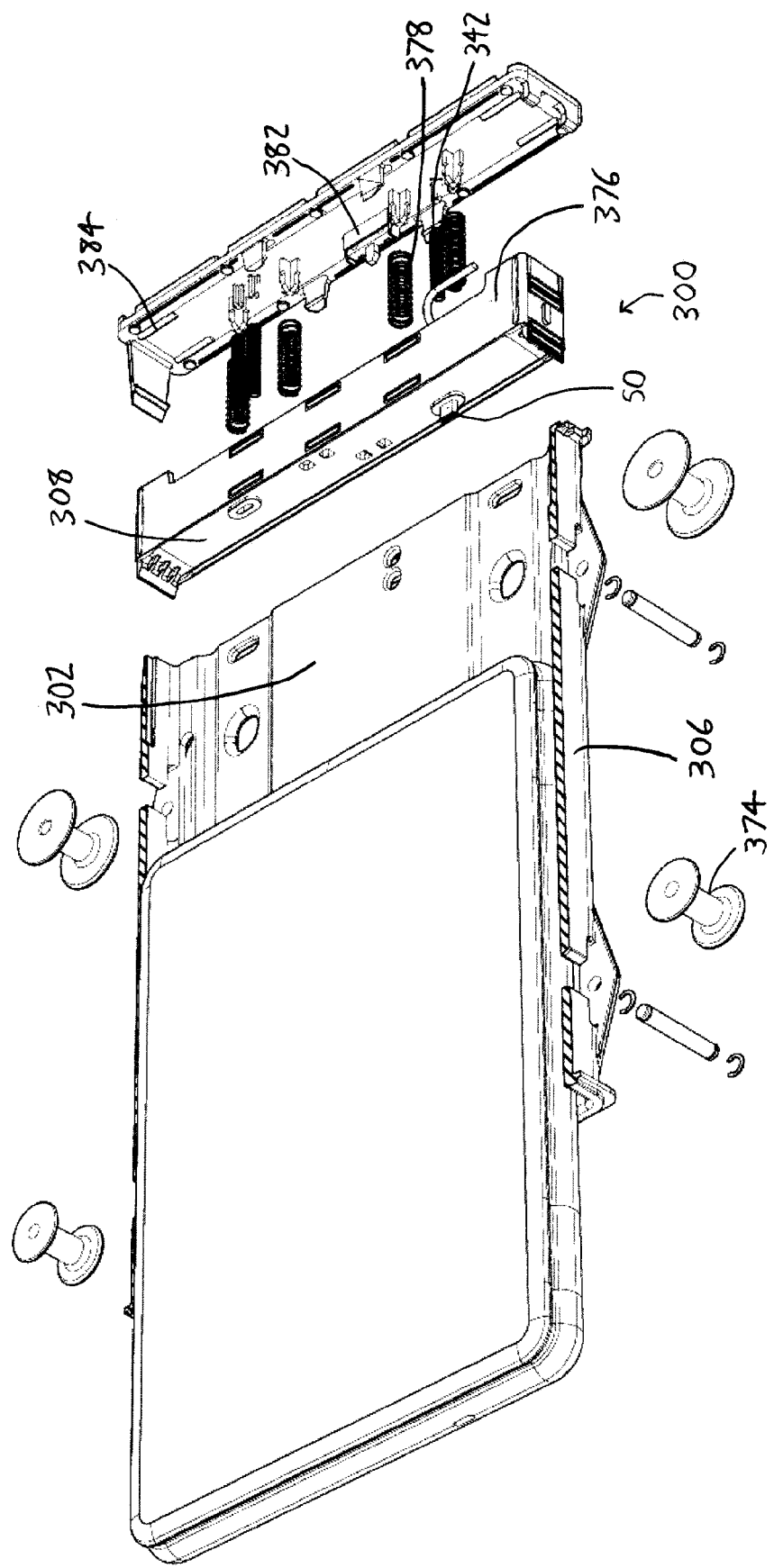
FIG. 3C is an exploded (disassembled) view of the dock 300 of FIGS. 3A and 3B with a PED 1000 partially inserted therein, and with its dock body sectioned.
Figure 3D:
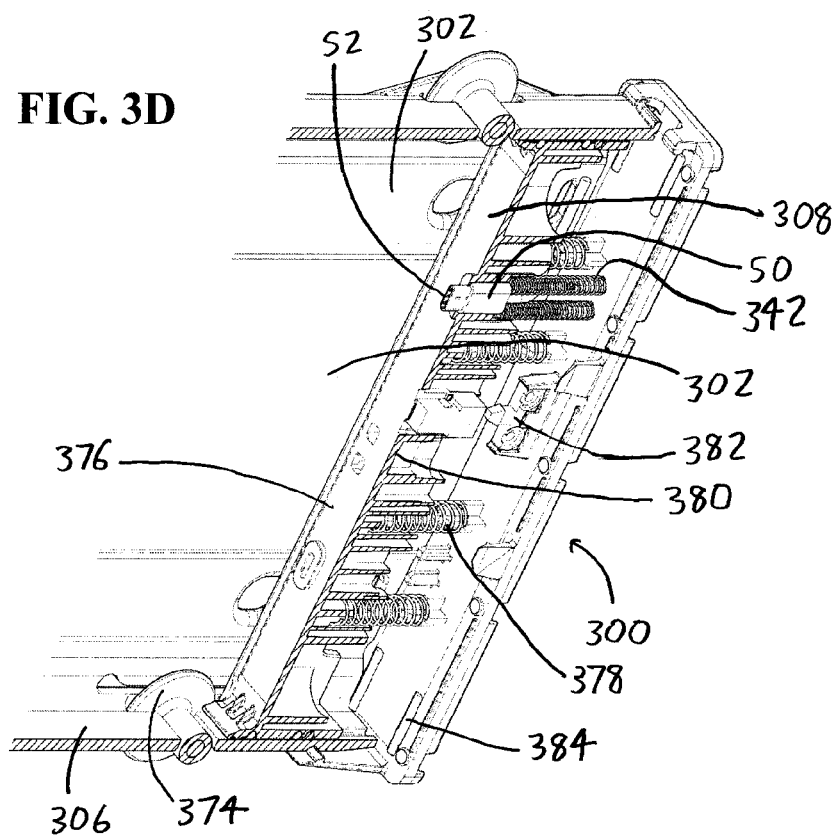
FIGS. 3D and 3E are sectioned views of the dock 300 of FIGS. 3A and 3B, with FIG. 3D showing its rear dock wall 308 in unloaded position (prior to installation of a PED 1000 in the dock 300), and FIG. 3E showing its rear dock wall 308 as positioned after installation of a PED 1000.
Figure 3E:
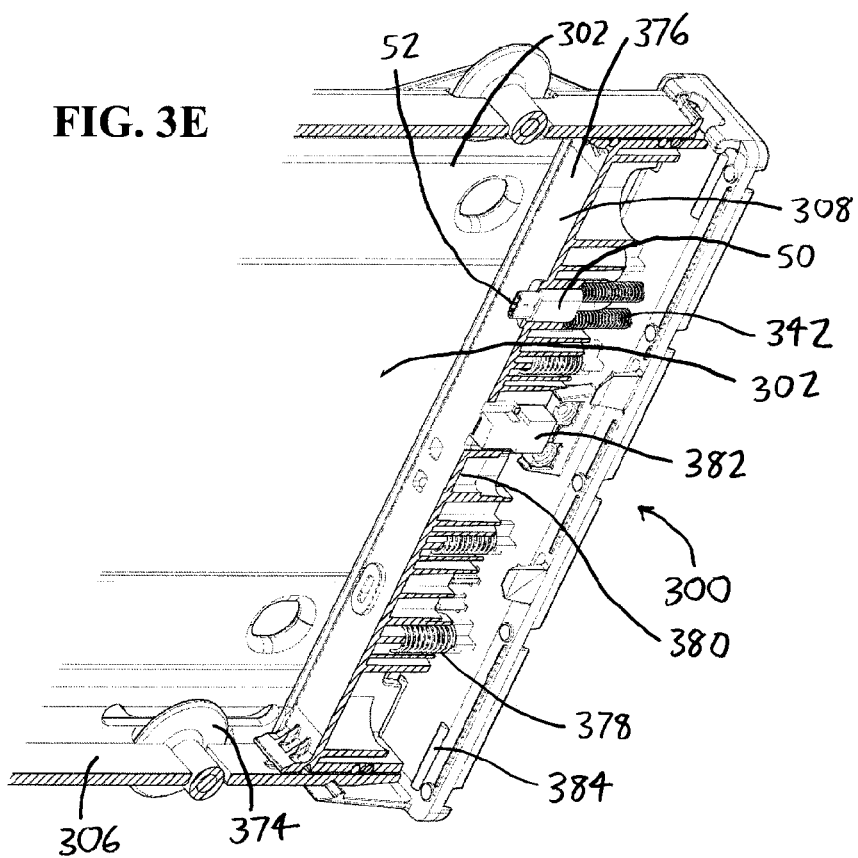

FIGS. 3A-3E illustrate another alternative dock 300 which, like the docks 100 and 200, may be connected to or otherwise arrayed adjacent similarly-configured docks 300 to provide an array of PED-receiving cavities for storage, powering, and data exchange of PEDs 1000. When a PED 1000 is inserted within the dock's cavity 302, the PED's sides are engaged and guided by alignment rollers 374 at the top and bottom dock walls 306 to better align the PED's onboard connector with an external connector 50 (FIGS. 3D and 3E, shown without a cord) situated on a "collapsible" rear dock wall 308. This collapsible rear dock wall 308 is defined by an outer face of a carriage 376 which is translatable within the dock cavity 302, and which is biased by carriage springs 378 to yield when the leading edge of the inserted PED 1000 encounters the rear dock wall 308 and pushes the carriage 376 further within the dock cavity 302. The external connector 50 is itself spring-loaded within the carriage 376 so that the external connector 50 can yield if the PED 1000 is not correctly aligned to engage its onboard connector with the external connector 50. As the rear dock wall 308 (and more generally the carriage 376) yields under the urging of the PED 1000, the carriage 376 further translates further within the dock cavity 302 until an inner face 380 of the carriage 376 is engaged by a push latch 382 (i.e., a latch that engages the inner carriage face 380 when this face first encounters the latch, but wherein the latch disengages the inner carriage face 380 if given a smart push). The inner carriage face 380 encounters elastomeric bumpers 384 if the carriage 376 is further urged into the dock cavity 302 by the inserted PED 1000. Thus, to summarize, a PED 1000 is inserted within the dock cavity 302, being guided by the alignment rollers 374 until its inserted leading edge encounters the rear dock wall 308 on the carriage 376 (typically with the carriage's external connector 50 being connected to the PED's onboard connector, but with the external connector 50 yielding within the carriage 376 if it does not connect to the PED's onboard connector). As the PED 1000 is further pushed, the rear dock wall 308 yields into the dock cavity 302 until the carriage 376 encounters the push latch 382 and bumpers 384, at which point the carriage 376 latches into a fully-inserted position. When the PED 1000 (and thus the carriage 376) is thereafter given a smart push inward, the push latch 382 releases, and the carriage's springs 378 urge the carriage 376 toward the mouth of the dock cavity 302, and thus extend the PED 1000 further from the dock cavity 302.

The dock 300 provides many of the same features of dock 100: it receives a PED for charging and/or data transfer, and protects the external connector 50 from damage if the inserted PED is misaligned with the connector 50; and it additionally protects the PED (and the dock 300) from wear and damage from overly vigorous insertion, as the rear dock wall 308 cushions impact. A benefit of the dock 300 is that the rear dock wall 308 can be made to accommodate a PED whether it is inserted properly (with its onboard connector in the bottom half of the dock cavity 302 in FIG. 3C), or whether it is inverted (such that its onboard connector is in the top half of the dock cavity 302 in FIG. 3C): note that the dock carriage 376 has the same configuration when fully rotated about the axis along which it translates, and can accommodate a second external connector 50 (not shown) in a location opposite the depicted external connector 50. When two external connectors 50 are installed, the dock 300 can accept an inserted PED for charging and data transfer even if the PED is inverted. In this case, the external connector 50 which does not engage the PED's onboard connector merely collapses into the carriage 376.

Throughout this document, the term "portable electronic device" (or "PED") should be construed as encompassing portable computers such as tablet computers, laptop computers, personal digital assistants, and similar devices; smartphones and/or other mobile telephones; portable gaming devices such as handheld gaming consoles, wearable gaming headpieces, and similar devices; and portable media players or recorders, such as e-readers, digital cameras, and similar devices. A PED can incorporate the features of more than one of the foregoing devices—for example, a PED may be a smartphone having computing, gaming, and media-playing/recording features—and may be handheld, wearable, or otherwise easily transportable by a user from one location to another.

Also, it should be understood that terms referring to orientation and position—e.g., "front" (as in "dock front"), "top" (as in "dock top"), etc.—are relative terms rather than absolute ones. In other words, it should be understood (for example) that the dock front referred to may in fact be located at the rear of the dock depending on the overall orientation of the dock. Thus, such terms should be regarded as words of convenience, rather than limiting terms.

Additionally, where a measurement or other value is qualified by the term "approximately," "about," "nearly," "roughly," or the like—for example, "approximately 50 cm"—this can be regarded as referring to a variation of 10% from the noted value. Thus, as an example, "approximately perpendicular" and "approximately parallel" can respectively be understood to mean within 9 degrees (i.e., 10% of 90 degrees) from perpendicular and parallel.

The versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A dock (100) for a personal electronic device (PED 1000) having an onboard connector configured for charging of and/or data transfer with the PED (1000), the dock (100) including:
   a. a dock cavity (102) configured to complementarily receive a PED (1000) inserted therein, the dock cavity (102) being bounded by a cavity wall (104, 106, 108), and
   b. an external connector (50) within the dock cavity (102), the external connector (50) being:
      (1) configured to connect to the inserted PED's onboard connector, and
      (2) resiliently biased to:
         i. protrude from the cavity wall (104, 106, 108), whereby the external connector (50) connects to the onboard connector of the inserted PED (1000) when the external connector (50) is aligned with the inserted PED's onboard connector, and
         ii. be pushed by the inserted PED to retract within the cavity wall (104, 106, 108) when the onboard connector of the inserted PED (1000) is not aligned with the external connector (50).

2. The dock (100) of claim 1 wherein:
   a. the cavity wall (104, 106, 108) includes opposing dock sidewalls (104) with a rear dock wall (108) extending therebetween,
   b. the rear dock wall (108) includes a connector passage (124):
      (1) extending rearwardly therefrom, and
      (2) having the external connector (50) situated therein, with the external connector (50) being movable within the connector passage (124) to protrude from, and retract within, the rear dock wall (108).

3. The dock (100) of claim 2 wherein each dock sidewall (104) is configured to engage the opposing dock sidewall (104), whereby two or more docks (100) may be engaged at their sidewalls (104) to form an array of docks (100).

4. The dock (100) of claim 2 further including a spring (142) within the connector passage (124), the spring (142) resiliently biasing the external connector (50) to protrude from the rear dock wall (108).

5. The dock (100) of claim 4 further including:
   a. a connector conduit (122):
      (1) surrounding the connector passage (124), and
      (2) protruding rearwardly from the rear dock wall (108),
   b. a cap (126):
      (1) configured to fit over the connector conduit (122),
      (2) bearing against the spring (142), and
      (3) having a connector aperture (140) defined therein, the connector aperture (140) being configured to pass the external connector (50).

6. The dock (100) of claim 5 wherein:
   a. the cross-section of the connector passage (124) has a maximum diameter oriented along a first axis, and
   b. the cross-section of the connector aperture (140) has a maximum diameter oriented along a second axis different from the first axis.

7. The dock (200) of claim 5 further including an elongated plunger (254) extending through the cap (226), wherein the spring (242) is situated between the plunger (254) and the cap (226) to resiliently bias the plunger (254) into the connector passage (224).

8. The dock (100) of claim 5 wherein the cap (126) includes a flexible leg (136) extending therefrom, the leg (136) being configured to releasably engage the connector conduit (122) when the cap (126) is fit over the connector conduit (122).

9. The dock (100) of claim 1 wherein the cavity wall (104, 106, 108) includes:
   a. opposing dock sidewalls (104) configured to complementarily receive a PED (1000) inserted within the dock cavity (102) between the dock sidewalls (104),
   b. a rear dock wall (108):
      (1) extending between the dock sidewalls (104),
      (2) having the external connector (50) protruding therefrom, and
      (3) configured to resiliently:
         i. yield rearwardly in response to any pressure from the inserted PED (1000), and
         ii. thereafter move forwardly when such pressure is relieved.

10. The dock (100) of claim 9 further including a dock floor (106):
    a. extending between the dock sidewalls (104), and
    b. spaced from the rear dock wall (108).

11. The dock (100) of claim 9 wherein each dock sidewall (104) is connected to the rear dock wall (108) by a corner (120) extending concavely out of the dock cavity (102) from the dock sidewall (104) and the rear dock wall (108).

12. The dock (100) of claim 11 wherein each corner (120) extends from the rear dock wall (108), and from its adjacent dock sidewall (104), along an arcuate path.

13. The dock (100) of claim 11 wherein a cavity width is defined between the dock sidewalls (104), the cavity width being narrowest adjacent the corners (120).

14. The dock (100) of claim 11 wherein the dock sidewalls (104) include opposing indents (114):
    a. protruding inwardly into the dock cavity (102), and
    b. spaced forwardly from the corners (120).

15. The dock (100) of claim 14 wherein each indent (114) is defined by an elongated ridge extending at least substantially parallel to the rear dock wall (108).

16. The dock (100) of claim 9 wherein each dock sidewall (104) is configured to engage the opposing dock sidewall (104), whereby two or more docks (100) may be engaged at their sidewalls to from an array of docks (100).

17. The dock (100) of claim 1 wherein:
    a. the cavity wall (104, 106, 108) includes opposing dock sidewalls (104) with a rear dock wall (108) extending therebetween,
    b. the rear dock wall (108) is connected to the dock sidewalls (104) at opposing corners (120),
    c. the dock sidewalls (104) each include at least one indent (114):
       (1) protruding inwardly into the dock cavity (102), and
       (2) spaced forwardly from the rear dock wall (108),
    d. the dock sidewalls (104) converge inwardly into the dock cavity (102) to define a narrowest cavity width between the dock sidewalls (104):
       (1) forwardly from the rear dock wall (108), and
       (2) rearwardly from the indents (114).

18. The dock (100) of claim 17 wherein the corners (120) are defined by concave depressions in the rear dock wall (108).

19. The dock (100) of claim 17 wherein the indents (114) are defined by elongated ridges extending at least substantially parallel to the rear dock wall (108).

20. The dock (200) of claim 1 wherein:
    a. the cavity wall (204, 206, 208) includes opposing dock sidewalls (204) with a rear dock wall (208) extending therebetween, the dock sidewalls (204) extending between a dock front (210) and the rear dock wall (208),
    b. further including a light pipe (266) having:
       (1) a first end (268) situated on the rear dock wall (208), and
       (2) an opposing second end (270) situated near the dock front (210).

* * * * *